(12) United States Patent
Beauchamp et al.

(10) Patent No.: US 8,968,566 B2
(45) Date of Patent: *Mar. 3, 2015

(54) SEPARATOR ASSEMBLY

(75) Inventors: Philip Paul Beauchamp, Rexford, NY (US); Michael Kent Cueman, Yorktown, VA (US); Daniel Jason Erno, Clifton Park, NY (US); Todd Alan Anderson, Niskayuna, NY (US); Dean David Marschke, Eden Prairie, MN (US)

(73) Assignee: General Electric Company, Niskayuna, NY (US)

( * ) Notice: Subject to any disclaimer, the term of this patent is extended or adjusted under 35 U.S.C. 154(b) by 923 days.

This patent is subject to a terminal disclaimer.

(21) Appl. No.: 13/157,705

(22) Filed: Jun. 10, 2011

(65) Prior Publication Data
US 2011/0233128 A1 Sep. 29, 2011

Related U.S. Application Data

(63) Continuation-in-part of application No. 12/259,622, filed on Oct. 28, 2008, now abandoned, and a continuation-in-part of application No. 13/149,448, filed on May 31, 2011.

(60) Provisional application No. 61/106,219, filed on Oct. 17, 2008.

(51) Int. Cl.
*B01D 63/10* (2006.01)
*B01D 63/12* (2006.01)
(Continued)

(52) U.S. Cl.
CPC .............. *B01D 63/10* (2013.01); *B01D 63/103* (2013.01); *C02F 1/441* (2013.01); *B01D 2313/12* (2013.01); *C02F 2103/08* (2013.01)

USPC ........... 210/321.74; 96/9; 96/11; 210/321.76; 210/321.83; 210/321.85

(58) Field of Classification Search
CPC ...... B01D 63/00; B01D 63/10; B01D 63/103; B01D 63/12; B01D 63/066; B01D 2311/165; B01D 2313/08; B01D 2313/10; B01D 2313/12; B01D 2313/14; B01D 2313/146; C02F 2103/08; C02F 1/441
USPC .............. 210/321.6, 321.72–321.76, 321.79, 210/321.8, 321.83–321.85, 321.88, 321.89, 210/500.23; 96/7–11
See application file for complete search history.

(56) References Cited

U.S. PATENT DOCUMENTS 3,386,583 A * 6/1968 Merten .................... 210/321.83
3,397,790 A * 8/1968 Navoy et al. ............. 210/321.83
(Continued)

FOREIGN PATENT DOCUMENTS

AU 16064 12/1971
DE 2055511 A1 6/1971
(Continued)

*Primary Examiner* — Joseph Drodge
(74) *Attorney, Agent, or Firm* — Andrew J. Caruso

(57) ABSTRACT

A novel separator assembly for a spiral flow reverse osmosis apparatus is provided. In one embodiment, the separator assembly comprises a central core element comprising at least two permeate exhaust conduits and not comprising a concentrate exhaust conduit. Each permeate exhaust conduit defines an exhaust channel and one or more openings allowing fluid communication between an exterior surface of the permeate exhaust conduit and the exhaust channel, said permeate exhaust conduits independently defining a cavity between said conduits. The cavity is configured to accommodate a first portion of a membrane stack assembly comprising at least one feed carrier layer, at least two permeate carrier layers, and at least two membrane layers. A first portion of the membrane stack assembly is disposed within the cavity, and a second portion of the membrane stack assembly is wound around the central core element and forms a multilayer membrane assembly disposed around the central core element.

25 Claims, 22 Drawing Sheets

(51) Int. Cl.
*C02F 1/44* (2006.01)
*C02F 103/08* (2006.01)

(56) References Cited

U.S. PATENT DOCUMENTS

| | | | |
|---|---|---|---|
| 3,554,378 A | | 1/1971 | Kohl |
| 3,722,694 A | * | 3/1973 | Agranat .................. 210/321.89 |
| 3,933,646 A | | 1/1976 | Kanamaru et al. |
| 3,962,095 A | | 6/1976 | Luppi |
| 3,966,616 A | | 6/1976 | Bray |
| 4,083,780 A | | 4/1978 | Call |
| 4,229,305 A | * | 10/1980 | Fecondini et al. ....... 210/321.83 |
| 4,855,058 A | * | 8/1989 | Holland et al. ............... 210/652 |
| 4,950,404 A | | 8/1990 | Chau |
| 5,034,126 A | | 7/1991 | Reddy et al. |
| 5,114,582 A | * | 5/1992 | Sandstrom et al. ...... 210/321.74 |
| 5,470,469 A | | 11/1995 | Eckman |
| 5,498,338 A | | 3/1996 | Kruger et al. |
| 5,580,452 A | | 12/1996 | Lin |
| 5,733,602 A | | 3/1998 | Hirose et al. |
| 5,858,229 A | | 1/1999 | Uemura et al. |
| 6,068,771 A | * | 5/2000 | McDermott et al. ...... 210/321.83 |
| 6,235,367 B1 | * | 5/2001 | Holmes et al. ................... 428/45 |
| 6,368,507 B1 | | 4/2002 | Koo et al. |
| 7,063,789 B2 | | 6/2006 | Colby et al. |
| 8,021,550 B2 | * | 9/2011 | Beauchamp et al. .... 210/321.85 |
| 2005/0029192 A1 | * | 2/2005 | Arnold et al. ................. 210/641 |
| 2008/0197069 A1 | | 8/2008 | Binkle et al. |
| 2009/0314713 A1 | * | 12/2009 | Shelby et al. ................. 210/636 |
| 2010/0096309 A1 | | 4/2010 | Beauchamp et al. |
| 2010/0096319 A1 | | 4/2010 | Beauchamp et al. |

FOREIGN PATENT DOCUMENTS

| | | |
|---|---|---|
| DE | 20209511 U1 | 9/2002 |
| GB | 1435985 | 5/1976 |
| JP | 06246125 A1 | 9/1994 |
| WO | WO9823361 A1 | 6/1998 |
| WO | WO2005070524 A1 | 8/2005 |

* cited by examiner

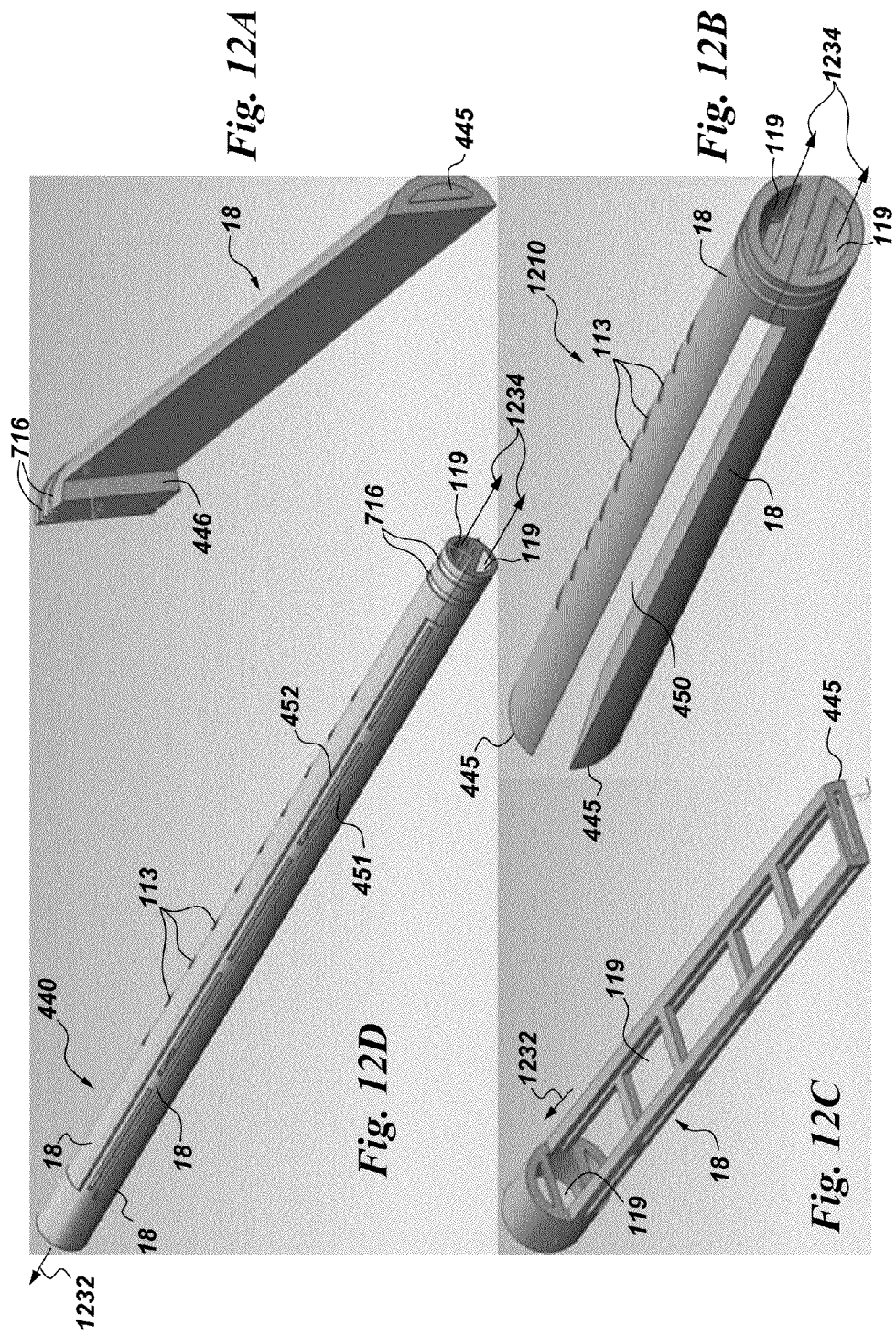

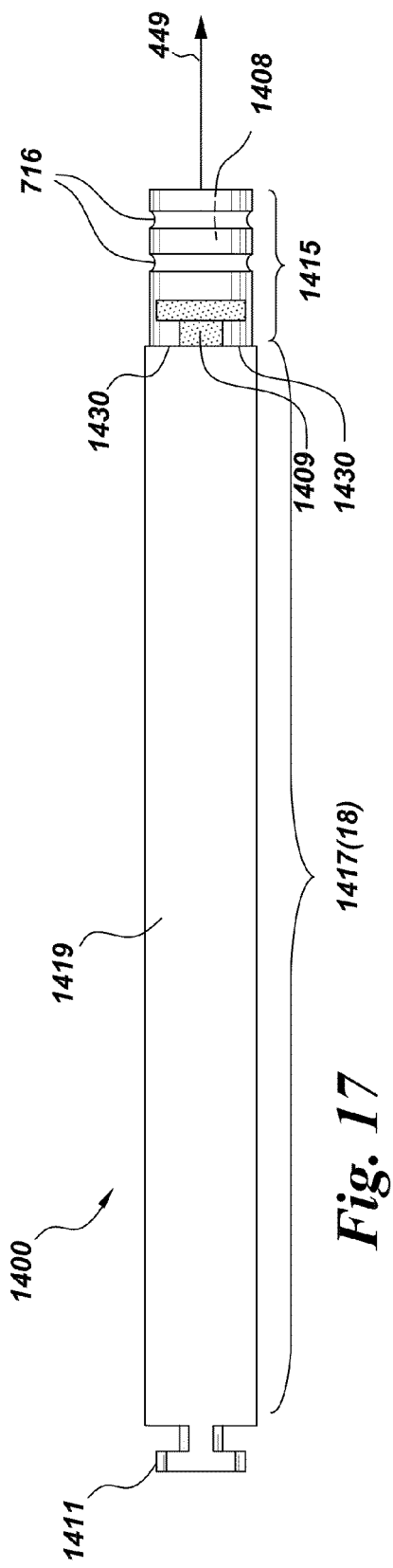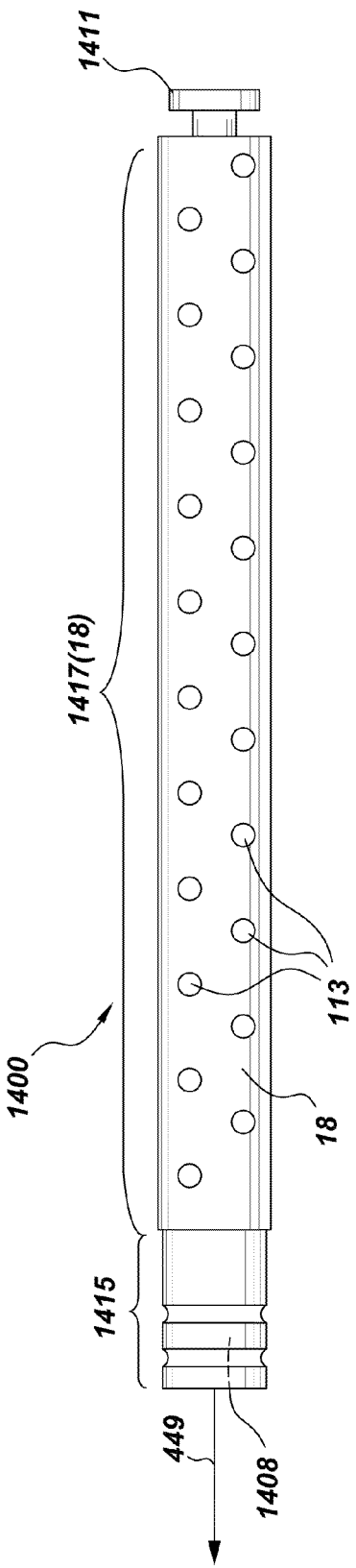

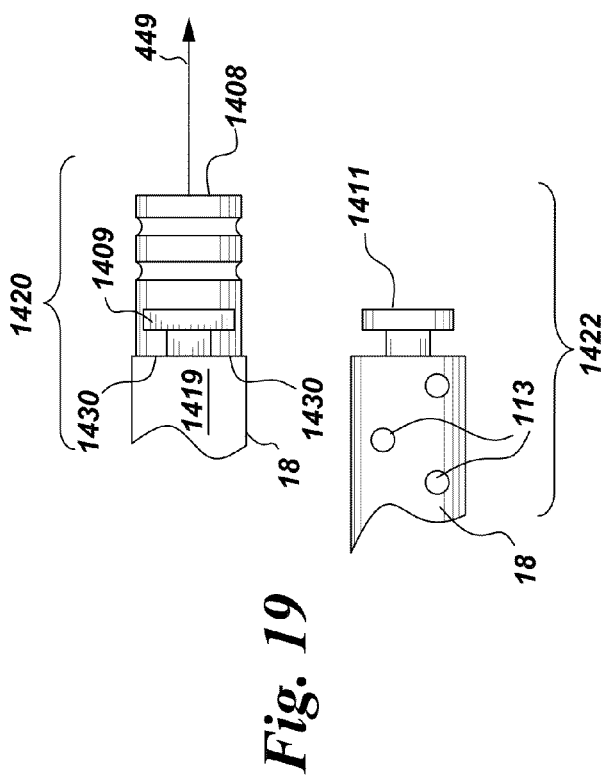
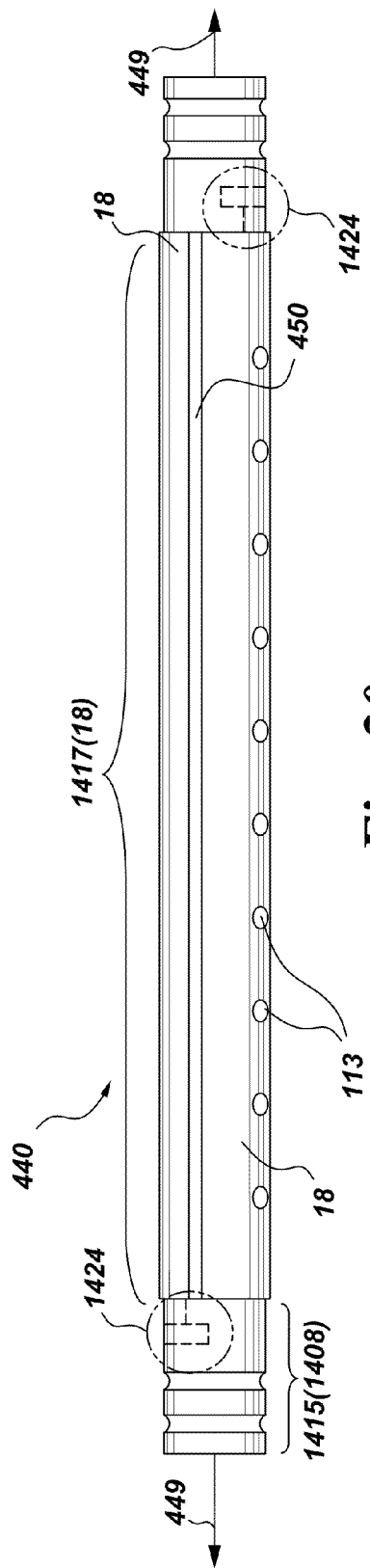

SEPARATOR ASSEMBLY

CROSS REFERENCE TO RELATED APPLICATIONS

This application claims the benefit of and is a Continuation-In-Part of pending U.S. Patent Application having application Ser. No. 12/259,622 filed Oct. 28, 2008, said U.S. Patent Application claiming priority to U.S. Provisional Application No. 61/106,219 filed Oct. 17, 2008 (now abandoned), and further claims the benefit of and is a Continuation-In-Part of U.S. patent application Ser. No. 13/149,448 filed May 31, 2011, each of which named Applications and Provisional Application is herein incorporated by reference in its entirety. Where subject matter present in any of the matter incorporated by reference is in conflict with subject matter in the present application, the present application will be considered authoritative.

BACKGROUND

This invention includes embodiments that generally relate to separator assemblies. In various embodiments, the invention relates to spiral flow separator assemblies. The invention also includes methods for making separator assemblies.

Conventional separator assemblies typically comprise a folded multilayer membrane assembly disposed around a porous exhaust conduit. The folded multilayer membrane assembly comprises a feed carrier layer in fluid contact with the active-surface of a membrane layer having an active surface and a passive surface. The folded multilayer membrane assembly also comprises a permeate carrier layer in contact with the passive surface of the membrane layer and a porous exhaust conduit. The folded membrane layer structure ensures contact between the feed carrier layer and the membrane layer without bringing the feed carrier layer into contact with the permeate carrier layer or the porous exhaust conduit. During operation, a feed solution containing a solute is brought into contact with the feed carrier layer of the multilayer membrane assembly which transmits the feed solution to the active surface of the membrane layer which modifies and transmits a portion of the feed solution as a permeate to the permeate carrier layer. The feed solution also serves to disrupt solute accretion at the active surface of the membrane layer and transport excess solute out of the multilayer membrane assembly. The permeate passes via the permeate carrier layer into the porous exhaust conduit which collects the permeate. Separator assemblies comprising folded multilayer membrane assemblies have been used in various fluid purification processes, including reverse osmosis, ultrafiltration, and microfiltration processes.

Folded multilayer membrane assemblies may be manufactured by bringing the active surface of a membrane layer having an active surface and a passive surface into contact with both surfaces of a feed carrier layer, the membrane layer being folded to create a pocket-like structure which envelops the feed carrier layer. The passive surface of the membrane layer is brought into contact with one or more permeate carrier layers to produce a membrane stack assembly in which the folded membrane layer is disposed between the feed carrier layer and one or more permeate carrier layers. A plurality of such membrane stack assemblies, each in contact with at least one common permeate carrier layer, is then wound around a porous exhaust conduit in contact with the common permeate carrier layer to provide the separator assembly comprising the multilayer membrane assembly and the porous exhaust conduit. The edges of the membrane stack assemblies are appropriately sealed to prevent direct contact of the feed solution with the permeate carrier layer. A serious weakness separator assemblies comprising a folded multilayer membrane assembly is that the folding of the membrane layer may result in loss of membrane function leading to uncontrolled contact between the feed solution and the permeate carrier layer.

Thus, there exists a need for further improvements in both the design and manufacture of separator assemblies comprising one or more multilayer membrane assemblies. Particularly in the realm of water purification for human consumption, there is a compelling need for more robust and reliable separator assemblies which are both efficient and cost effective.

BRIEF DESCRIPTION

In one embodiment, the present invention provides a separator assembly comprising a central core element comprising at least two permeate exhaust conduits and not comprising a concentrate exhaust conduit, each of said permeate exhaust conduits defining an exhaust channel and one or more openings which allow fluid communication between an exterior surface of the permeate exhaust conduit and the exhaust channel, said permeate exhaust conduits comprising at least one spacer element defining a cavity between said permeate exhaust conduits, said cavity being configured to accommodate a first portion of a membrane stack assembly; and a membrane stack assembly comprising at least one feed carrier layer, at least two permeate carrier layers, and at least two membrane layers; wherein said first portion of the membrane stack assembly is disposed within the cavity defined by the permeate exhaust conduits, and wherein a second portion of the membrane stack assembly forms a multilayer membrane assembly disposed around the central core element.

In yet another embodiment, the present invention provides a separator assembly comprising a central core element comprising at least two permeate exhaust conduits and not comprising a concentrate exhaust conduit, each of said permeate exhaust conduits defining an exhaust channel and one or more openings which allow fluid communication between an exterior surface of the permeate exhaust conduit and the exhaust channel, said permeate exhaust conduits independently defining a cavity between said permeate exhaust conduits, said cavity being configured to accommodate a first portion of a membrane stack assembly; and a membrane stack assembly comprising at least one feed carrier layer, at least two permeate carrier layers, and at least two membrane layers; wherein said first portion of the membrane stack assembly is disposed within the cavity defined by the permeate exhaust conduits, and wherein a second portion of the membrane stack assembly forms a multilayer membrane assembly disposed around the central core element.

In yet another embodiment, the present invention provides a separator assembly comprising a central core element comprising at least two identical core element components, each of said core element components comprising at least one permeate exhaust conduit and at least one friction coupling, said friction couplings being configured to join said core element components to form a central core element defining a cavity configured to accommodate a first portion of a membrane stack assembly; and a membrane stack assembly comprising at least one feed carrier layer, at least two permeate carrier layers, and at least two membrane layers; wherein said first portion of the membrane stack assembly is disposed within the cavity defined by the central core element, wherein a second portion of the membrane stack assembly forms a multilayer membrane assembly disposed around the central core element, and wherein the core element components do not comprise a concentrate exhaust conduit.

In yet another embodiment, the present invention provides a separator assembly comprising a central core element comprising two identical core element components, each core element component comprising a first section defining an exit cavity and a second section comprising a permeate exhaust conduit, each core element component comprising a first friction coupling and a second friction coupling joining the two core element components and defining a cavity between the permeate exhaust conduits configured to accommodate a first portion of a membrane stack assembly; and a membrane stack assembly comprising at least one feed carrier layer, at least two permeate carrier layers, and at least two membrane layers; wherein said first portion of the membrane stack assembly is disposed within the cavity defined by the central core element, wherein a second portion of the membrane stack assembly forms a multilayer membrane assembly disposed around the central core element, and wherein the core element components do not comprise a concentrate exhaust conduit.

In another embodiment, the present invention provides a spiral flow reverse osmosis apparatus comprising: (a) a pressurizable housing; and (b) a separator assembly comprising: (i) a central core element comprising at least two permeate exhaust conduits and not comprising a concentrate exhaust conduit, each of said permeate exhaust conduits defining an exhaust channel and one or more openings which allow fluid communication between an exterior surface of the permeate exhaust conduit and the exhaust channel, said permeate exhaust conduits comprising at least one spacer element defining a cavity between said permeate exhaust conduits, said cavity being configured to accommodate a first portion of a membrane stack assembly; and (ii) a membrane stack assembly comprising at least one feed carrier layer, at least two permeate carrier layers, and at least two membrane layers; wherein said first portion of the membrane stack assembly is disposed within said cavity, and wherein a second portion of the membrane stack assembly forms a multilayer membrane assembly disposed around the central core element.

These and other features, aspects, and advantages of the present invention may be understood more readily by reference to the following detailed description.

BRIEF DESCRIPTION OF THE DRAWING FIGURES

These and other features, aspects, and advantages of the present invention will become better understood when the following detailed description is read with reference to the accompanying drawings in which like characters may represent like parts throughout the drawings.

Figure 13A:
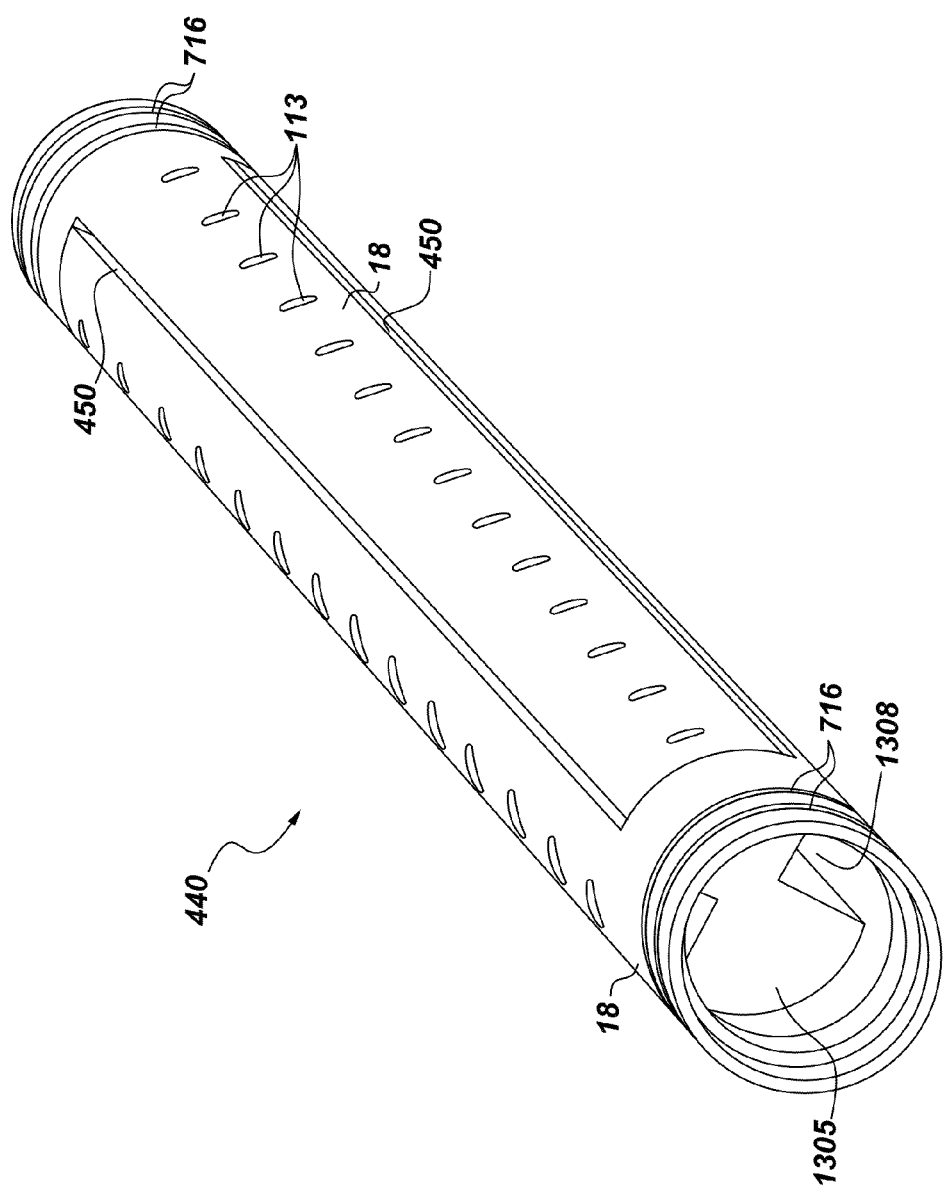
Figure 13B:
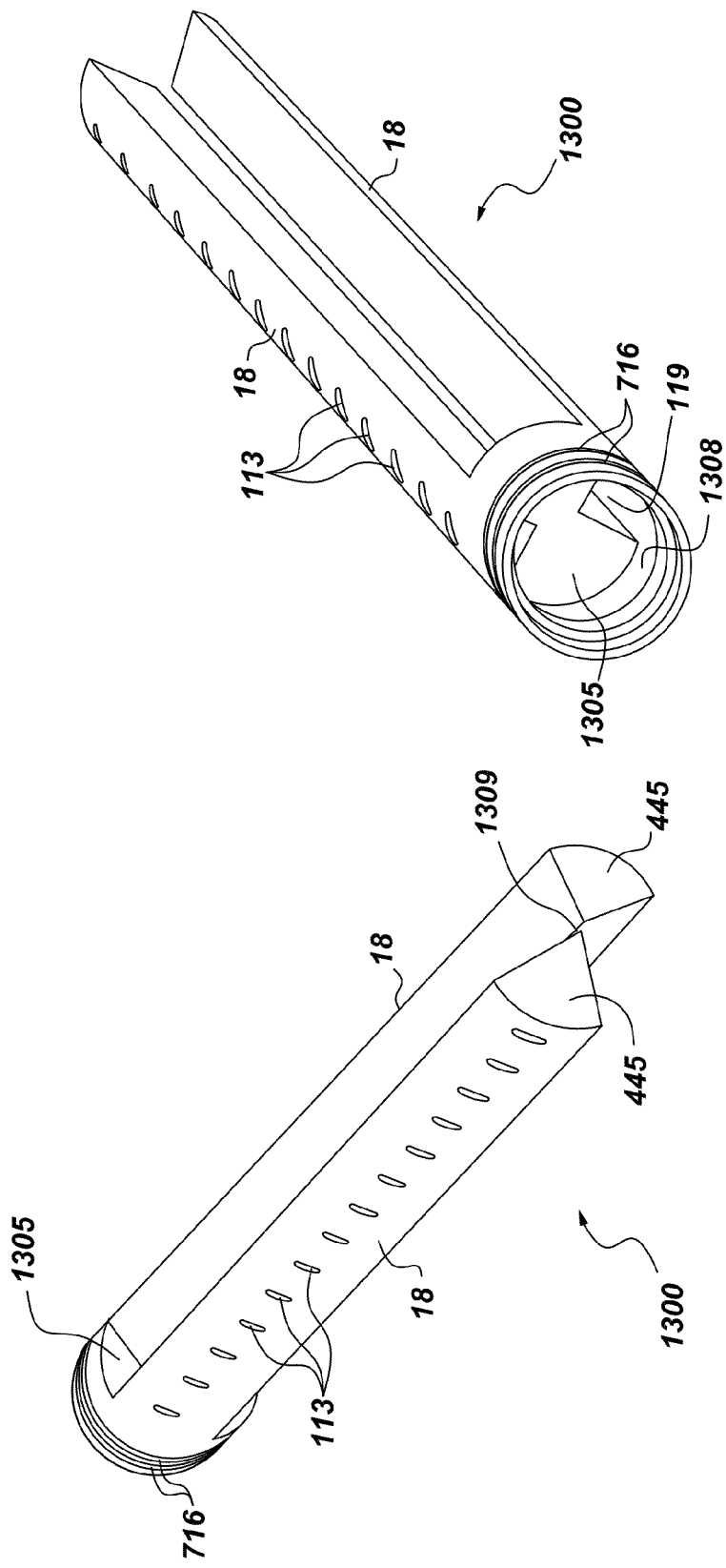
Figure 13C:
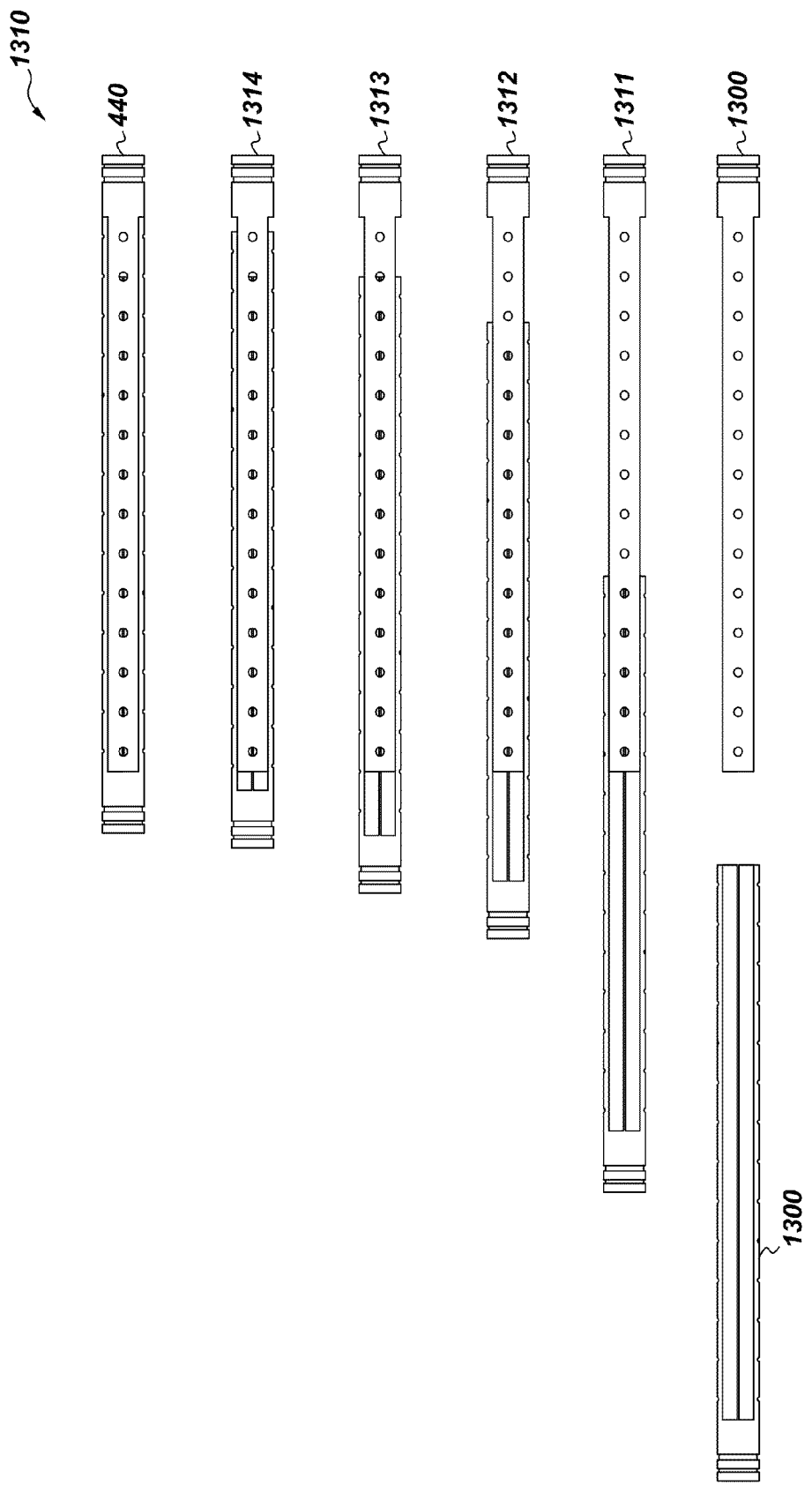
Figure 14:
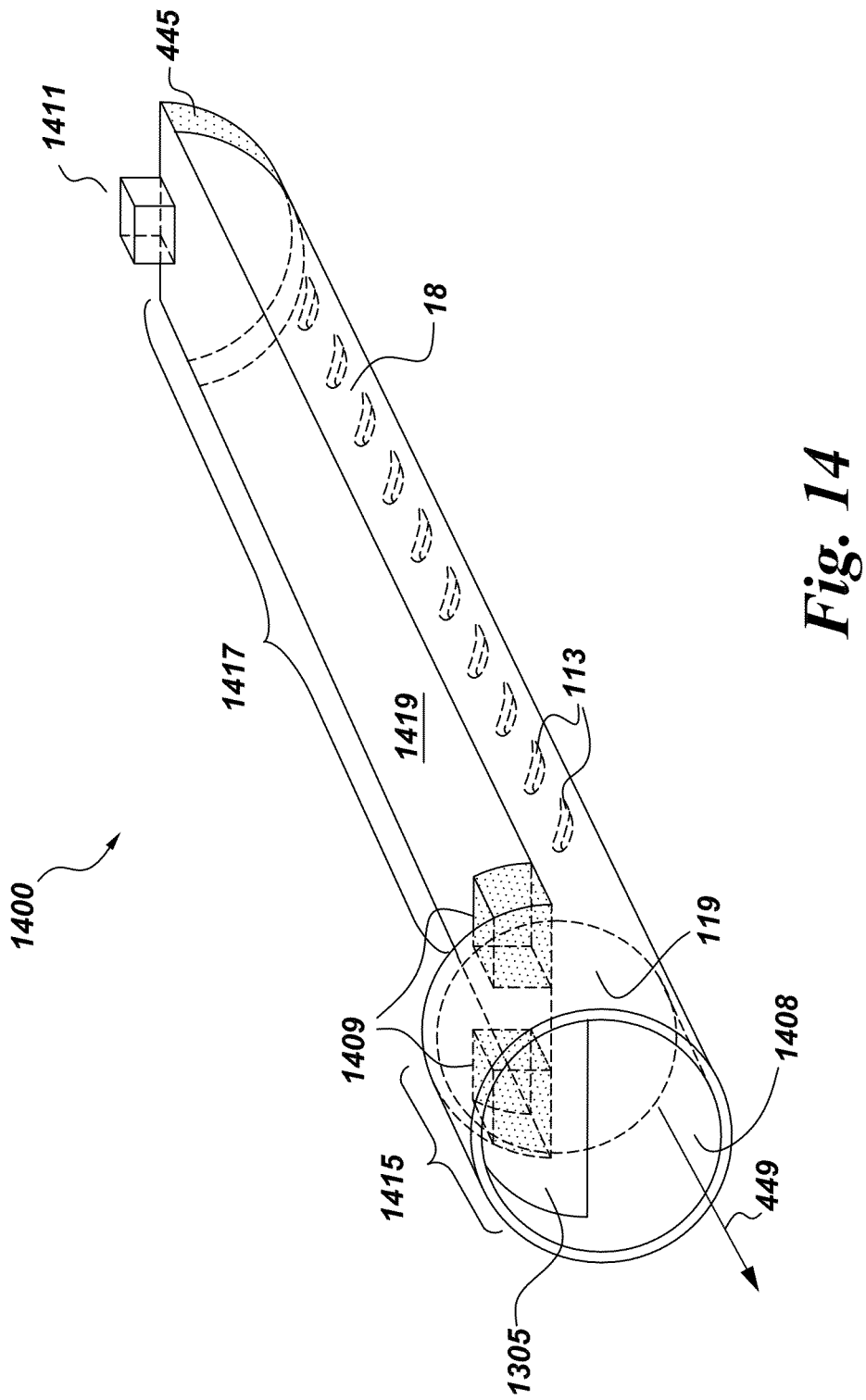

FIG. 12A, FIG. 12B, FIG. 12C and FIG. 12D illustrate a central core element which may be used in accordance with one or more embodiments of the present invention FIG. 13A, FIG. 13B and FIG. 13C illustrate a central core element which may be used in accordance with one or more embodiments of the present invention FIG. 14 illustrates a core element component which may be used in accordance with one or more embodiments of the invention.

Figure 15:
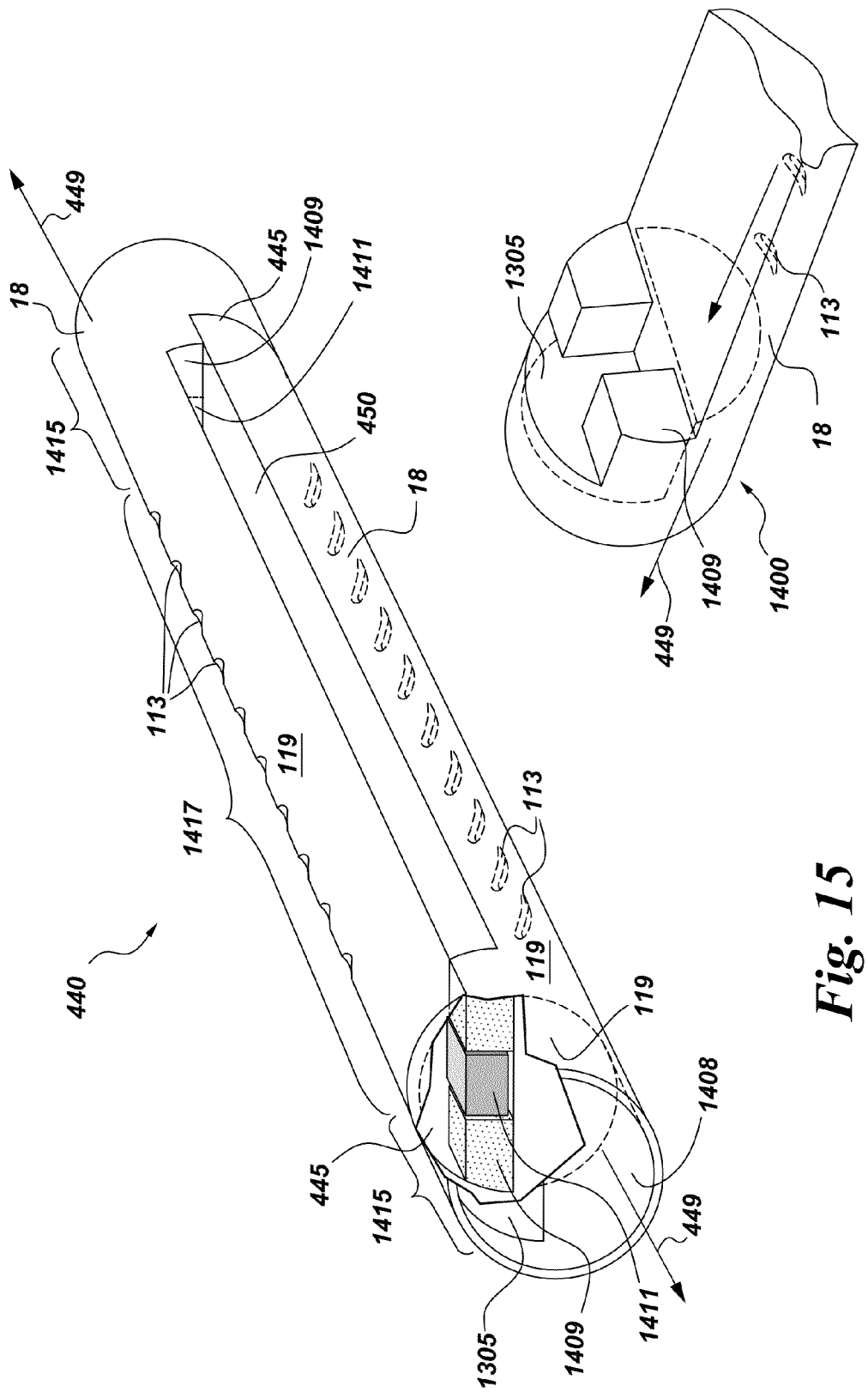

FIG. 15 illustrates a central core element which may be used in accordance with one or more embodiments of the invention.

Figure 16:
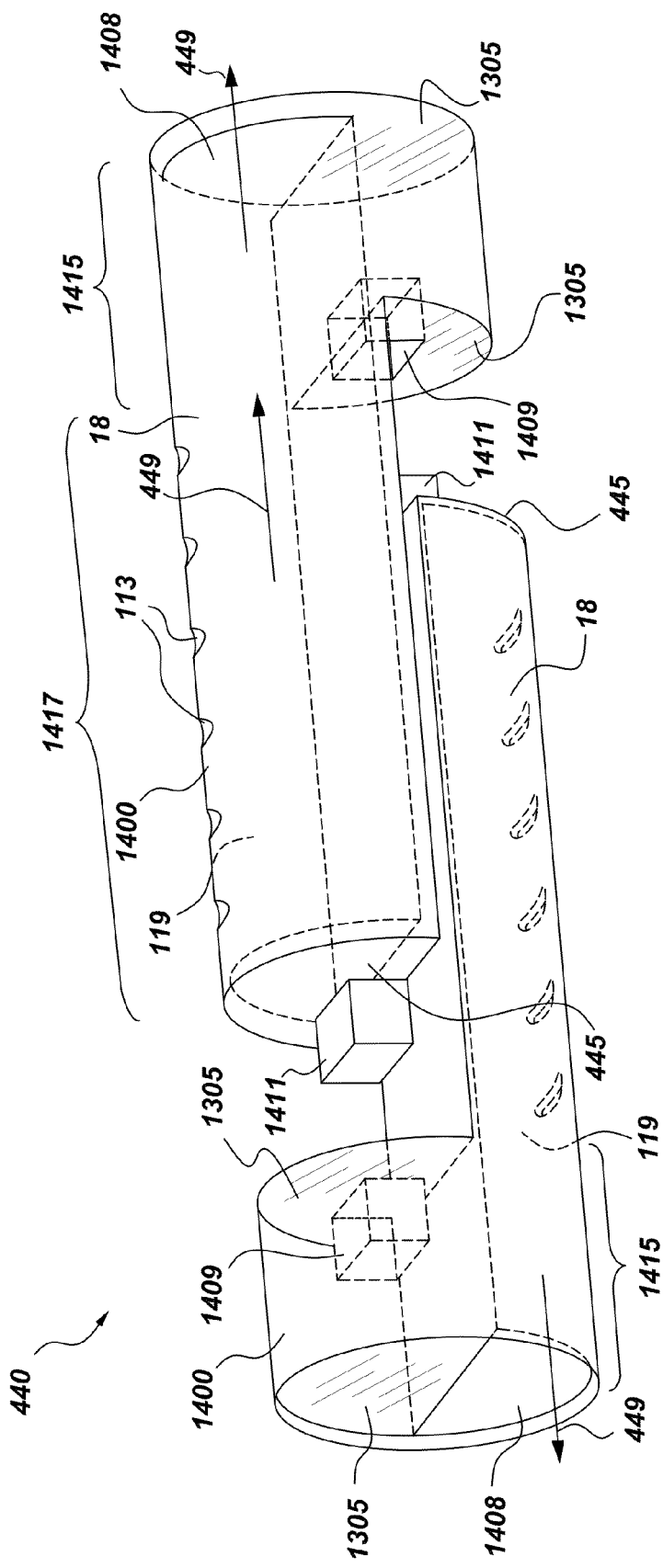

FIG. 16 illustrates a central core element which may be used in accordance with one or more embodiments of the invention.

FIG. 17 illustrates a core element component which may be used in accordance with one or more embodiments of the invention.

FIG. 18 illustrates a core element component which may be used in accordance with one or more embodiments of the invention.

FIG. 19 illustrates core element components which may be used in accordance with one or more embodiments of the invention.

FIG. 20 illustrates a central core element which may be used in accordance with one or more embodiments of the invention.

DETAILED DESCRIPTION

In the following specification and the claims, which follow, reference will be made to a number of terms, which shall be defined to have the following meanings.

The singular forms "a", "an", and "the" include plural referents unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As noted, in one embodiment, the present invention provides a separator assembly comprising a central core element and a membrane stack assembly. The central core element comprises at least two permeate exhaust conduits and does not comprise a concentrate exhaust conduit. Each of the permeate exhaust conduits defines an exhaust channel and one or more openings which allow fluid communication between an exterior surface of the permeate exhaust conduit and the exhaust channel. These openings are perforations in an exterior surface of the permeate exhaust conduit and are distinct from an open terminus of the exhaust channel defined by the permeate exhaust conduit and through which, during operation, permeate exits the exhaust channel. The exterior surface of the permeate exhaust conduit in which the openings are defined is in direct contact with a permeate carrier layer comprised by the membrane stack assembly. During operation, permeate passes from the permeate carrier layer through these openings and into the exhaust channel defined by the permeate exhaust conduit. The membrane stack assembly comprises at least one feed carrier layer, at least two permeate carrier layers, and at least two membrane layers. In various embodiments of the present invention the permeate exhaust conduits define a cavity between themselves which is configured to accommodate a first portion of the membrane stack assembly. This cavity may be defined by one or more spacer elements which form a part of the permeate exhaust conduit, or as in the case of the embodiments shown in FIG. 13A-FIG. B and FIG. 14-FIG. 20, by a first section of a core element component attached to a second section of the same core element component comprising the permeate exhaust conduit (More will be said about this in due course). While in certain of the figures presented in this disclosure, permeate exhaust conduits may appear to be separated by a first portion of the membrane stack assembly disposed between them, it is emphasized that the various central core elements used in accordance with the invention, all define at least one cavity configured to accommodate a first portion of a membrane stack assembly, and this cavity is defined independently of the membrane stack assembly or any structure apart from the central core element itself. A second portion of the membrane stack assembly forms a multilayer membrane assembly disposed around the central core element. The first portion membrane stack assembly is disposed within one or more cavities defined by the central core element and the second portion of the membrane stack assembly is disposed around the central core element such that the feed carrier layer is not in contact with a permeate exhaust conduit, and such that permeate carrier layers are in contact with at least one permeate exhaust conduit.

As noted, the central core element comprises at least two permeate exhaust conduits and does not comprise a concentrate exhaust conduit. In general, an exhaust conduit may be a permeate exhaust conduit or a concentrate exhaust conduit depending on which layer or layers of the membrane stack assembly it is in contact with. A layer is "in contact" with an exhaust conduit when the layer is configured to permit transfer of fluid from the layer into the conduit without passing through an intervening membrane layer. A permeate exhaust conduit is in contact with a permeate carrier layer surface (or in certain embodiments a membrane layer surface) in such a way that permeate may pass from the permeate carrier layer into the permeate exhaust conduit. A concentrate exhaust conduit must be in contact with a concentrate carrier layer (at times herein referred to as a feed carrier layer) surface in such a way that concentrate may pass from the concentrate carrier layer into the concentrate exhaust conduit. Each permeate exhaust conduit is typically a porous tube running the length of the separator assembly, although other configurations may fall within the meaning of the term permeate exhaust conduit, for example a longitudinally grooved structure, which structure may or may not be cylindrical, running the length of the separator assembly. Suitable porous tubes which may serve as the permeate exhaust conduit include perforated metal tubes, perforated plastic tubes, perforated ceramic tubes and the like. In one embodiment, the permeate exhaust conduit is not perforated but is sufficiently porous to allow passage of fluid from the permeate carrier layer into the interior of the permeate exhaust conduit (also referred to herein as the permeate exhaust channel). Fluid passing from the permeate carrier layer into the permeate exhaust conduit is at times herein referred to as "permeate" (or "the permeate"). In one embodiment, the central core element comprises two permeate exhaust conduits each of which is a porous half-cylinder shaped tube. In an alternate embodiment, the central core element comprises two permeate exhaust conduits each of which is a porous half-octagon shaped tube. In another embodiment, the central core element comprises two permeate exhaust conduits each of which is a porous half-decahedron shaped tube. In yet another embodiment, the central core element comprises two permeate exhaust conduits each of which is a porous half-tetradecahedron shaped tube. In one embodiment, the central core element comprises at least two permeate exhaust conduits at least one of which is a porous teardrop shaped tube. The permeate exhaust conduits may at each occurrence within a separator assembly have the same or different shapes. In one embodiment, the separator assembly comprises one or more permeate exhaust conduits having a shape different from another permeate exhaust conduit present in the same separator assembly. In another embodiment, all of the permeate exhaust conduits present in a separator assembly have the same shape.

Figure 2A:
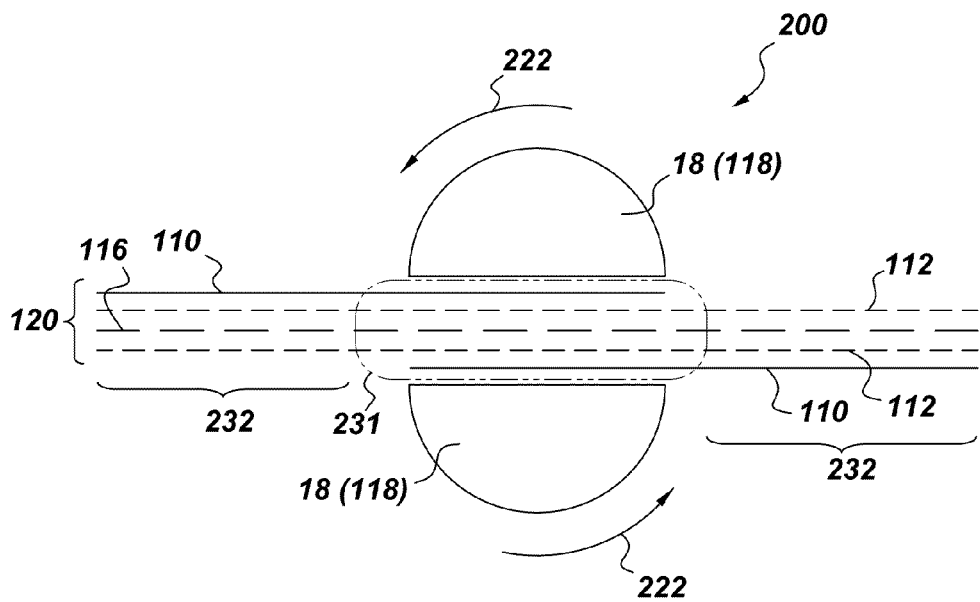
FIG. 2A and FIG. 2B illustrate a membrane stack assembly and central core element in accordance with one or more embodiments of the present invention.
Figure 2B:
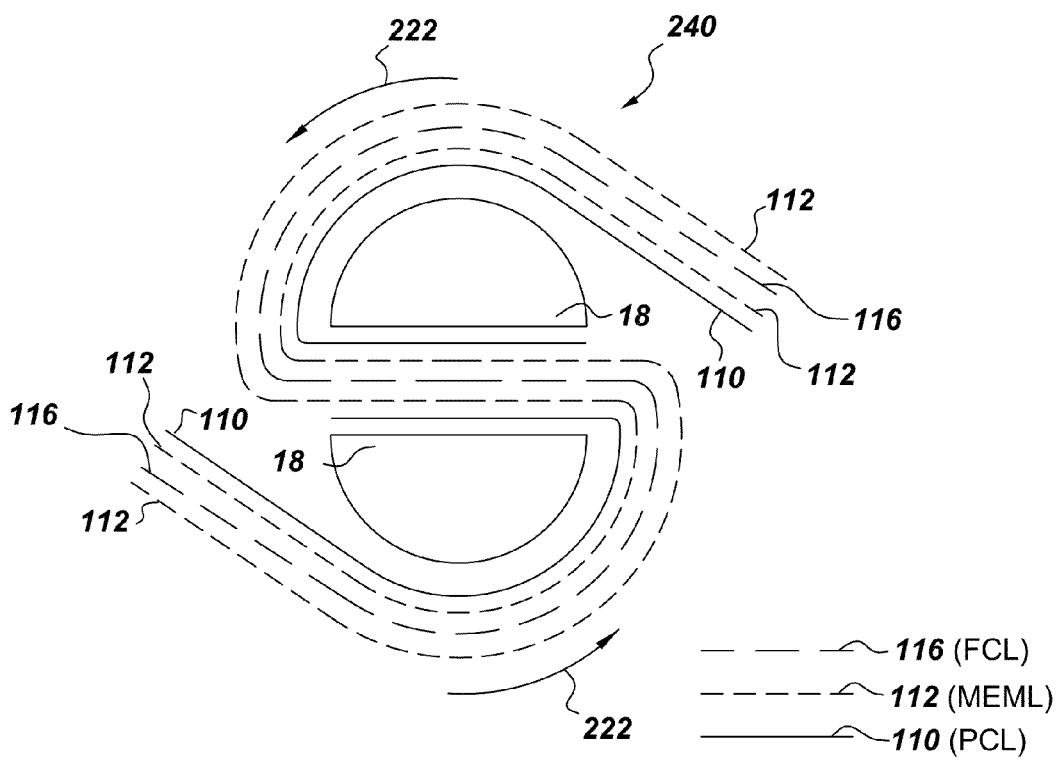

As used herein, the term "multilayer membrane assembly" refers to a second portion of the membrane stack assembly disposed around the central core element. FIG. 2A and FIG. 2B disclosed herein illustrate first and second portions (231 and 232) of the membrane stack assembly 120. In the embodiment shown, the multilayer membrane assembly is a combination of at least one feed carrier layer, at least two permeate carrier layers, and at least two membrane layers disposed around a central core element comprising at least two permeate exhaust conduits and not comprising a concentrate exhaust conduit.

In one embodiment, the multilayer membrane assembly may be formed by disposing a first portion (231, FIG. 2A) of a membrane stack assembly (120) within a cavity defined by the central core element and then rotating the central core element, thereby winding a second portion (232, FIG. 2A) of the membrane stack assembly around the central core element. As is disclosed in detail herein, the configuration of the membrane stack assembly and the disposing of the membrane stack assembly within the cavity defined by the central core element are such that upon winding of the membrane stack assembly around the central core element to provide a wound structure and securing of the free ends of the membrane stack assembly after winding, a separator assembly comprising a multilayer membrane assembly disposed around the central core element is obtained. Those skilled in the art will appreciate the close relationship, in certain embodiments, between the membrane stack assembly and the multilayer membrane assembly, and that the membrane stack assembly is the precursor of the multilayer membrane assembly. It is convenient to regard the membrane stack assembly as "unwound" and the multilayer membrane assembly as "wound". It should be emphasized, however, that as defined herein a multilayer membrane assembly is not limited to the "wound" form of one or more membrane stack assemblies disposed within a central core element as other means of disposing the second portion of the membrane stack assembly around the central core element may become available. In various embodiments, the separator assembly provided by the present invention comprises a multilayer membrane assembly comprising a second portion of one or more membrane stack assemblies radially disposed around a central core element such that the component membrane layers of the multilayer membrane assembly are free of folds or creases. In various embodiments, the separator assembly provided by the present invention is characterized by a permeate carrier layer flow path length which is significantly shorter than the corresponding permeate carrier layer flow path length in a conventional separator assembly. The length of the permeate carrier layer flow path is an important factor affecting the magnitude of the pressure drop across the separator assembly. Thus, one of the many advantages provided by the present invention is greater latitude in the selection of useful operating conditions. As will become apparent to those of ordinary skill in the art after reading this disclosure, the present invention also offers significant advantages in terms of ease and cost of manufacture of separator assemblies generally.

As noted, the membrane stack assembly and multilayer membrane assembly comprise at least one feed carrier layer (at times herein referred to as the concentrate carrier layer). Materials suitable for use as the feed carrier layer include flexible sheet-like materials through which a feed solution may flow. In various embodiments of the present invention, the feed carrier layer is configured such that flow of a feed solution through the feed carrier layer occurs along the axis of the separator assembly from points on a first surface of the separator assembly (the "feed surface") where the feed carrier layer is in contact with the feed solution and terminating at a second surface of the separator assembly where a concentrate emerges (the "concentrate surface") from the feed carrier layer. The feed carrier layer may comprise structures which promote turbulent flow at the surface of the membrane layer in contact with the feed carrier layer as a means of preventing excessive solute build-up (accretion) at the membrane surface. In one embodiment, the feed carrier layer is comprised of a perforated plastic sheet. In another embodiment, the feed carrier layer is comprised of a perforated metal sheet. In yet another embodiment, the feed carrier layer comprises a porous composite material. In yet another embodiment, the feed carrier layer is a plastic fabric. In yet another embodiment, the feed carrier layer is a plastic screen. The feed carrier layer may be comprised of the same material as the permeate carrier layer or a material different from that used for the permeate carrier layer. In various embodiments of the present invention the feed carrier layer is not in contact with an exhaust conduit of the separator assembly.

As noted, the membrane stack assembly and the multilayer membrane assembly comprise at least two permeate carrier layers. Materials suitable for use as the permeate carrier layers include flexible sheet-like materials through which a permeate may flow. In various embodiments of the present invention, the permeate carrier layers are configured such that during operation permeate flows in a spiral path along the permeate carrier layer to one of at least two permeate exhaust conduits. In one embodiment, the permeate carrier layer is comprised of a perforated plastic sheet. In another embodiment, the permeate carrier layer is comprised of a perforated metal sheet. In yet another embodiment, the permeate carrier layer comprises a porous composite. In yet another embodiment, the permeate carrier layer is a plastic fabric. In yet another embodiment, the permeate carrier layer is a plastic screen. The permeate carrier layers of the separator assembly provided by the present invention may be made of the same or different materials, for example one permeate carrier layer may be a plastic fabric while the other permeate carrier layer is a natural material such as wool fabric. In addition a single permeate carrier layer may comprise different materials at different locations along the permeate flow path through the permeate carrier layer. In one embodiment, for example, the present invention provides a separator assembly comprising a permeate carrier layer a portion of which is a polyethylene fabric and another portion of which is polypropylene fabric.

As noted, in various embodiments, the separator assemblies provided by the present invention comprise at least two membrane layers. Membranes and materials suitable for use as membrane layers are well-known in the art. U.S. Pat. No. 4,277,344, for example, discloses a semipermeable membrane prepared from the reaction of an aromatic polyamine with a polyacyl halide which has been found to be effective in reverse osmosis systems directed at rejecting sodium, magnesium and calcium cations, and chlorine, sulfate and carbonate anions. U.S. Pat. No. 4,277,344, for example, discloses a membrane prepared from the reaction of an aromatic polyacyl halide with a bifunctional aromatic amine to afford a polymeric material which has been found useful in the preparation of membrane layers effective in reverse osmosis systems directed at rejecting certain salts, such as nitrates. A host of technical references describing the preparation of various membranes and materials suitable for use as the membrane layer in various embodiments of the present invention are known to those of ordinary skill in the art. In addition, membranes suitable for use as the membrane layer in various embodiments of the present invention are well known and widely available articles of commerce.

In one embodiment, at least one of the membrane layers comprises a functionalized surface and an unfunctionalized surface. In one embodiment, the functionalized surface of the membrane layer represents an active surface of the membrane and the unfunctionalized surface of the membrane layer represents a passive surface of the membrane. In an alternate embodiment, the functionalized surface of the membrane layer represents a passive surface of the membrane and the unfunctionalized surface of the membrane layer represents an active surface of the membrane. In various embodiments of the present invention, the active surface of the membrane layer is typically in contact with the feed carrier layer and serves to prevent or retard the transmission of one or more solutes present in the feed solution across the membrane to the permeate carrier layer.

As used herein the phrase "not in contact" means not in "direct contact" (i.e. the referenced elements do not touch one another), but also may include the further limitation that the referenced elements be separated by an intervening membrane layer. For example, two layers of the membrane stack assembly, or the multilayer membrane assembly, are "not in contact" when there is an intervening membrane layer between them despite the fact that the two layers are in fluid communication, since in general a fluid may pass from one layer to the other via the intervening layer. As used herein the phrase "in contact" includes "direct contact" as well as additional configurations. For example, adjacent layers in the membrane stack assembly, or the multilayer membrane assembly, are said to be "in contact" because they touch one another. In addition, layers "in contact" with one another include configurations in which two permeate carrier layers in a membrane stack assembly are separated by an intervening third permeate carrier layer. Similarly, two feed carrier layers separated by an intervening third feed carrier layer are said to be in contact with one another. Similarly a layer touching the surface of an exhaust conduit, as for example when a layer is wound around the exhaust conduit, is said to be "in contact" with the exhaust conduit provided that fluid may pass from the layer into the exhaust conduit. As a further illustration, the permeate carrier layer is said to be in contact with the permeate exhaust conduit when the permeate carrier layer is in direct contact with the permeate exhaust conduit, as for example when the permeate carrier layer is wound around the permeate exhaust conduit with no intervening layers between the surface of the permeate exhaust conduit and the permeate carrier layer. Similarly, the feed carrier layer is said to be not in contact with the permeate exhaust conduit, as when, for example, the feed carrier layer is separated from the porous exhaust conduit by an intervening membrane layer which itself is separated from the porous exhaust conduit by an intervening permeate carrier layer in direct contact with the surface of the porous exhaust conduit. In general, the feed carrier layer has no point of contact with the permeate exhaust conduits and fluid from the feed carrier layer may not enter the porous exhaust conduits without first passing through an intervening membrane layer.

In one embodiment, the multilayer membrane assembly is radially disposed around the central core element. As used herein the phrase "radially disposed" means that a second portion of the membrane stack assembly comprising at least one feed carrier layer, at least two membrane layers, and at least two permeate carrier layers is wound around a central core element comprising at least two permeate exhaust conduits in a manner that limits the creation of folds or creases in the membrane layers. In general, the greater the extent to which a membrane layer is deformed by folding or creasing, the greater the likelihood of damage to the active surface of the membrane, loss of membrane function, and membrane integrity. Conventional separator assemblies typically comprise a highly folded multilayer membrane assembly comprising multiple folds in the membrane layer. Assuming the unfolded membrane layer represents a 180 degree straight angle, a highly folded membrane layer can be described as having a fold characterized by a reflex angle of greater than about 340 degrees. In one embodiment, the separator assembly provided by the present invention contains no membrane layer folds characterized by a reflex angle greater than 340 degrees. In an alternate embodiment, the separator assembly provided by the present invention contains no membrane layer folds characterized by a reflex angle greater than 300 degrees. In yet another embodiment, the separator assembly provided by the present invention contains no membrane layer folds characterized by a reflex angle greater than 270 degrees.

In one embodiment, the separator assembly provided by the present invention may be used as a salt separator assembly for separating salt from water. The feed solution may be, for example, seawater or brackish water. Typically the separator assembly is contained within a cylindrical housing which permits initial contact between the feed solution and the feed carrier layer only at one end of the separator assembly. This is typically accomplished by securing the separator assembly within the cylindrical housing with, for example one or more gaskets, which prevent contact of the feed solution with surfaces of the separator assembly other than the feed surface. To illustrate this concept the separator assembly can be thought of as a cylinder having a first surface and a second surface each having a surface area of $\pi r^2$, wherein "r" is the radius of the cylinder defined by the separator assembly, and a third surface having a surface area of $2\pi rh$ wherein "h" is the length of the cylinder. The separator assembly can by various means be made to fit snugly into a cylindrical housing such that a feed solution entering the cylindrical housing from one end encounters only the first surface (the "feed surface") of the separator assembly and does not contact the second or third surfaces of the separator assembly without passing through the separator assembly. Thus, the feed solution enters the separator assembly at points on the first surface of the separator assembly where the feed carrier layer is in contact with the feed solution, the edges of the membrane stack assembly being sealed to prevent contact and transmission of the feed solution from the first surface of separator assembly by the permeate carrier layer. Thus, the feed solution enters the separator assembly at the "feed surface" (first surface) of the separator assembly and travels along the length (axis) of the separator assembly during which passage, the feed solution is modified by its contact with the membrane layer through which a portion of the feed solution ("permeate" or "the permeate") passes and contacts the permeate carrier layer. The feed solution is said to flow axially through the separator assembly until it emerges as "concentrate" (also referred to at times as brine) at the second surface of the separator assembly, sometimes referred to herein as the "concentrate surface". The flow of feed solution through the separator assembly is at times herein referred to as "cross-flow", and the term "cross-flow" may be used interchangeably with the term "axial flow" when referring to the flow of feed solution. One of ordinary skill in the art will appreciate that as a feed solution, for example seawater, travels from an initial point of contact between the feed solution with the feed carrier layer on the feed surface ("first surface") of the separator assembly toward the concentrate surface ("second surface"), the concentration of salt present in the fluid in the feed carrier layer is increased through the action of the salt-rejecting membrane layer in contact with the feed solution passing through the feed carrier layer, and that the concentrate reaching the concentrate surface will be characterized by a higher concentration of salt than the seawater used as the feed solution.

The roles and function of the permeate exhaust conduits and permeate carrier layers may be illustrated using the salt separator assembly example above. Thus, in one embodiment, the separator assembly may be used as a salt separator assembly for separating salt from water. The feed solution, for example seawater, is contacted with the feed surface (first surface) of a cylindrical separator assembly contained within a pressurizable housing. The separator assembly is configured such that the permeate carrier layer cannot transmit feed solution from the feed surface to a permeate exhaust conduit. As the feed solution passes through the feed carrier layer it contacts the salt-rejecting membrane layer which modifies and transmits a fluid comprising one or more components of the feed solution to the permeate carrier layer. This fluid transmitted by the salt-rejecting membrane layer, called permeate (or "the permeate"), passes along the permeate carrier layer until it reaches that portion of the permeate carrier layer in contact with the exterior of the permeate exhaust conduit, where the permeate is transmitted from the permeate carrier layer into the interior of the permeate exhaust conduit. Flow of permeate through the permeate carrier layers is referred to as "spiral flow" since the permeate tends to follow a spiral path defined by the permeate carrier layer toward the permeate exhaust conduit. One of ordinary skill in the art will appreciate that as a feed solution, is modified and transmitted by the salt-rejecting membrane layer into the permeate carrier layer, the concentration of salt in the permeate is reduced relative to the feed solution due to the salt-rejecting action of the membrane layer.

In one embodiment, the separator assembly provided by the present invention comprises a central core element comprising two permeate exhaust conduits. In an alternate embodiment, the separator assembly provided by the present invention comprises a central core element comprising three or more permeate exhaust conduits. In one embodiment, the separator assembly comprises a central core element comprising from two to eight permeate exhaust conduits. In another embodiment, the separator assembly comprises a central core element comprising from 2 to 6 permeate exhaust conduits. In yet another embodiment, the separator assembly comprises a central core element comprising from three to four permeate exhaust conduits.

In one embodiment, the separator assembly provided by the present invention comprises a single feed carrier layer. In an alternate embodiment, the separator assembly provided by the present invention comprises a plurality of feed carrier layers. In one embodiment, the number of feed carrier layers is in a range of from one layer to six layers. In another embodiment, the number of feed carrier layers is in a range of from two layers to five layers. In still another embodiment, the number of feed carrier layers is in a range of from three layers to four layers.

In one embodiment, the separator assembly comprises at least two permeate carrier layers. In one embodiment, the number of permeate carrier layers is in a range of from two layers to six layers. In another embodiment, the number of permeate carrier layers is in a range of from 2 layers to five layers. In still another embodiment, the number of permeate carrier layers is in a range of from three layers to four layers.

In one embodiment, the separator assembly provided by the present invention comprises at least two membrane layers. In one embodiment, the number of membrane layers is in a range of from two layers to six layers. In another embodiment, the number of membrane layers is in a range of from two layers to five layers. In still another embodiment, the number of membrane layers is in a range of from three layers to four layers. In one embodiment, the number of membrane layers is directly proportional to the active surface area required to be provided by the separator assembly.

Figure 1:
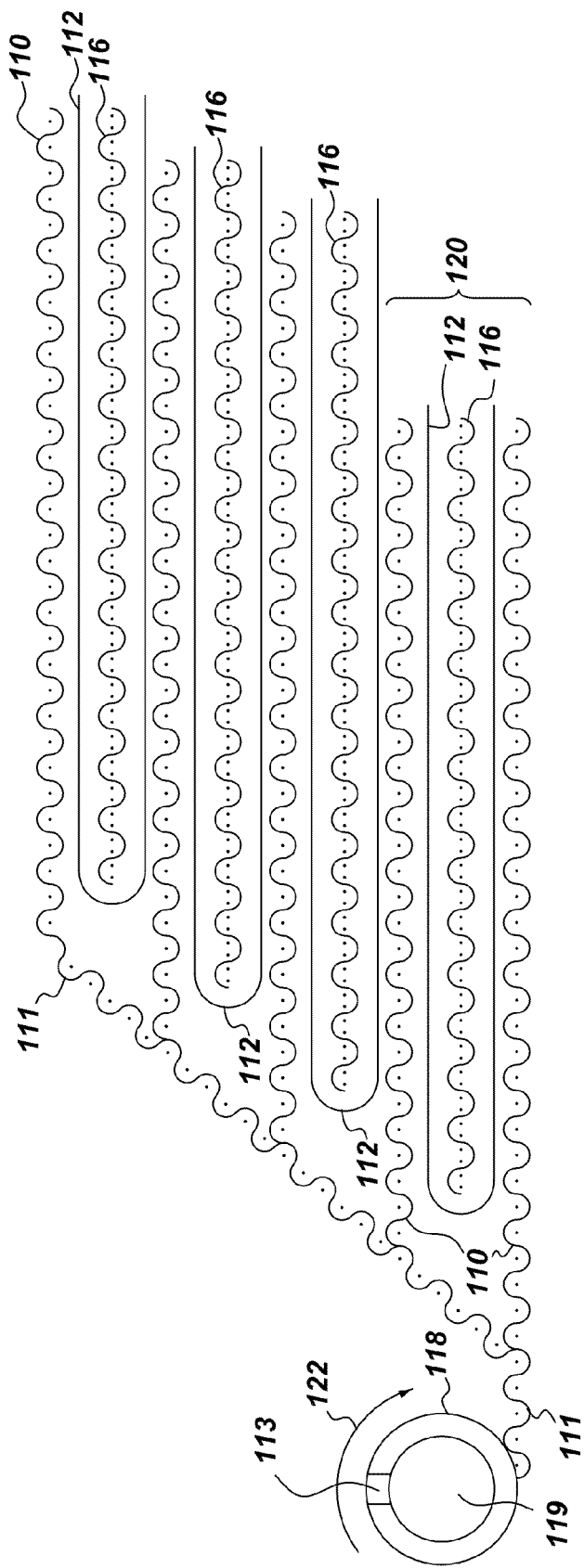
FIG. 1 illustrates the components of a conventional separator assembly and method of its assembly.

Referring to FIG. 1, the figure represents the components of and method of making a conventional separator assembly. A conventional membrane stack assembly 120 comprises a folded membrane layer 112 wherein a feed carrier layer 116 is sandwiched between the two halves of the folded membrane layer 112. The folded membrane layer 112 is disposed such that an active side (not shown in figure) of the folded membrane layer is in contact with the feed carrier layer 116. An active side of the membrane layer 112 is at times herein referred to as "the active surface" of the membrane layer. The folded membrane layer 112 is enveloped by permeate carrier layers 110 such that the passive side (not shown in figure) of the membrane layer 112 is in contact with the permeate carrier layers 110. A passive side of the membrane layer 112 is at times herein referred to as "the passive surface" of the membrane layer. Typically, an adhesive sealant (not shown) is used to isolate the feed carrier layer from the permeate carrier layer and prevent direct contact between a feed solution (not shown) and the permeate carrier layer. A plurality of membrane stack assemblies 120 wherein each of the permeate carrier layers 110 is connected to a common permeate carrier layer 111 in contact with the permeate exhaust conduit 118 is wound around the permeate exhaust conduit 118, for example by rotating the permeate exhaust conduit 118 in direction 122, and the resultant wound structure is appropriately sealed to provide a conventional separator assembly. The permeate exhaust conduit comprises openings 113 to permit fluid communication between the permeate exhaust conduit channel 119 and the common permeate carrier layer 111. As the membrane stack assemblies are wound around the permeate exhaust conduit 118, the reflex angle defined by the folded membrane layer 112 approaches 360 degrees.

Referring to FIG. 2A, the figure represents cross-section view at midpoint 200 of a first portion 231 of a membrane stack assembly 120 disposed within a cavity defined by a central core element comprising two porous exhaust conduits 18 (also referred to as permeate exhaust conduits 118 since they are in direct contact with the permeate carrier layers 110), and a second portion 232 of the membrane stack assembly 120 disposed outside of the central core element. The first portion 231 of membrane stack assembly is disposed within a cavity defined by the porous exhaust conduits 18 (permeate exhaust conduits 118) of the central core element. The membrane stack assembly 120 illustrated in FIG. 2A and FIG. 2B comprises two permeate carrier layers 110, two membrane layers 112, and a single feed carrier layer 116. Rotation of the central core element comprising porous exhaust conduits 18 in direction 222 affords the partially wound structure 240 shown in FIG. 2B. Partially wound structure 240 is obtained by rotating the central core element of the assembly shown in FIG. 2A through a 180 degree rotation in direction 222. That portion (the second portion 232) of the membrane stack assembly 120 which is wound around the central core element becomes the multilayer membrane assembly of the completed separator assembly. A separator assembly 300 (FIG. 3) is obtained by completely winding the second portion of the membrane stack assembly around the central core element and securing the ends of the membrane stack assembly. Note that in FIG. 3 the porous exhaust conduits are labeled as permeate exhaust conduits 118 since they are in direct contact with permeate carrier layers 110.

Figure 3:
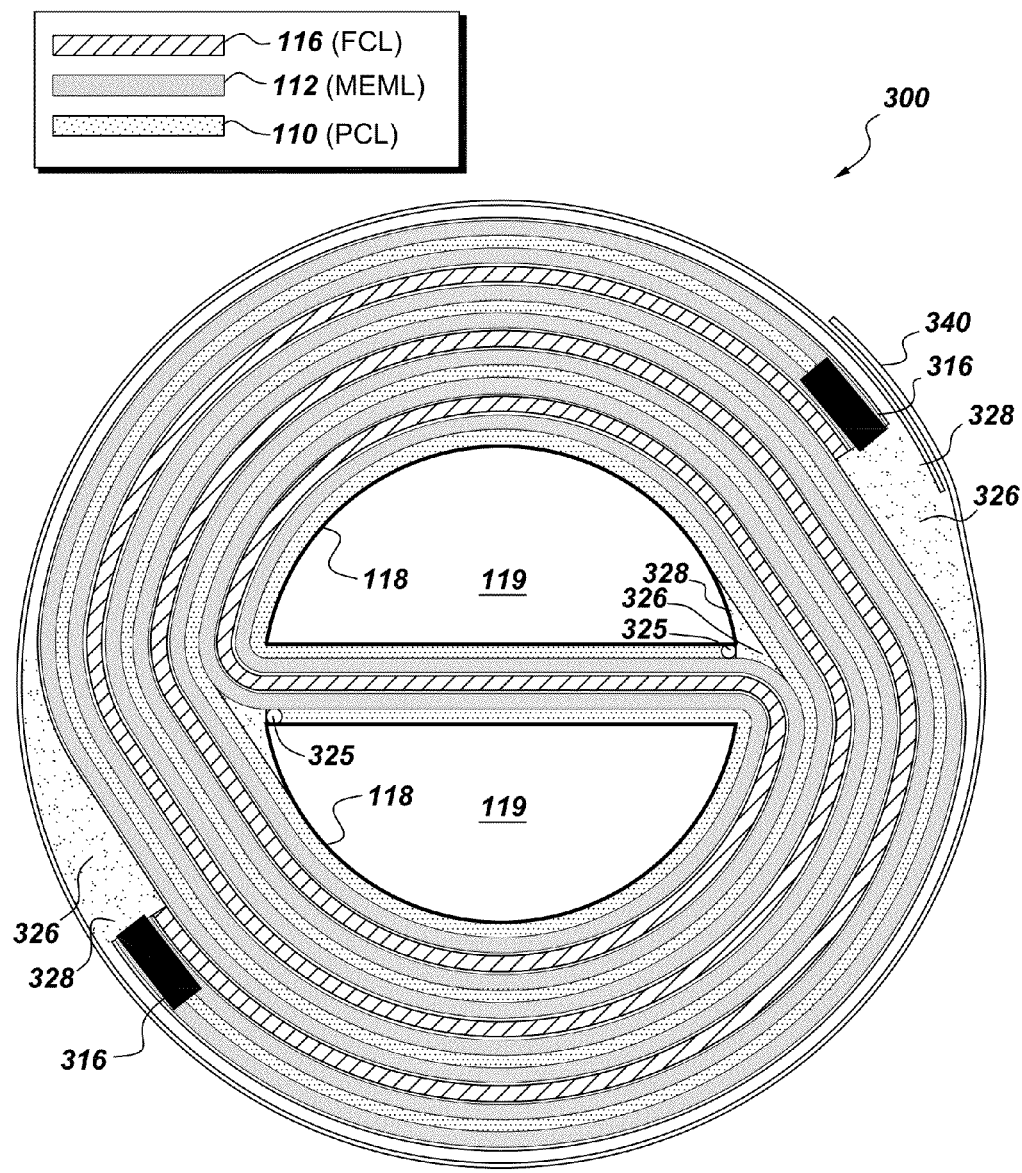
FIG. 3 illustrates a separator assembly in accordance with one or more embodiments of the present invention.

Referring to FIG. 3, the figure represents a cross-section view at midpoint of a separator assembly 300 comprising a central core element in accordance with an embodiment of the invention. Separator assembly 300 comprises a central core element comprising two permeate exhaust conduits 118, each permeate exhaust conduit 118 defining an interior channel 119 also at times herein referred to as exhaust channel 119. The central core element shown in FIG. 3 is shown as defining a cavity which accommodates a first portion of a membrane stack assembly 120 (FIG. 2A). The membrane stack assembly comprises one feed carrier layer 116, two permeate carrier layers 110, and two membrane layers 112, the membrane layers 112 being disposed between the feed carrier layer 116 and the permeate carrier layers 110. In the view shown, the permeate exhaust conduits 118 of the central core element define and are separated by a cavity configured to accommodate a first portion 231 (FIG. 2A) of the membrane stack assembly 120. A second portion 232 (FIG. 2A) of the membrane stack assembly forms a multilayer membrane assembly disposed around the central core element. FIG. 3 shows clearly that the feed carrier layer is not in contact with either of the permeate exhaust conduits or the permeate carrier layers. In the embodiment shown, the ends of membrane stack assembly 120 are secured with sealing portion 316. Sealing portion 316 is a transverse line of sealant (typically a curable glue) which seals the outermost permeate carrier layer to the two adjacent membrane layers 112, said transverse line running the length of the separator assembly 300. The "third surface" of the separator assembly 300 illustrated in FIG. 3 is wrapped in tape 340. Also featured in the separator assembly 300 illustrated in FIG. 3 are transverse sealant lines 325 which secure the innermost ends of the permeate carrier layers 110 to the permeate exhaust conduits 118. Transmission of feed solution from the feed surface (See FIG. 4A) of the separator assembly 300 by either the permeate carrier layer or the membrane layer may be prevented by the presence of a sealant applied near the edge of the membrane layer and permeate carrier layer. Typically the sealant is applied to the passive surface of the membrane layer 112 which when contacted with the adjacent permeate carrier layer the sealant penetrates and seals the edge of permeate carrier layer. The sealant does not typically penetrate through the active surface of the membrane layer and thus does not come into contact with either the active surface (not shown) of the membrane layer 112 or the feed carrier layer 116. A variety of adhesive sealants, such as glues and/or double-sided tapes may be used to secure the ends of the multilayer membrane assembly to one another (sealing portion 316), the permeate carrier layers to the permeate exhaust conduits (transverse sealant line 325), and the edges of the membrane layers and permeate carrier layers to one another at the feed surface and the concentrate surface of the separator assembly (See FIG. 5B, Method Step 506, edge sealant element 526). Also featured in FIG. 3 are gaps 328 between the outer surface of the separator assembly 300 and outermost layer of the multilayer membrane assembly, and between the portions of the permeate exhaust conduits and the multilayer membrane assembly. It should be noted that the gaps illustrated in FIG. 3 are not present at all in various embodiments of the separator assemblies comprising the central core element provided by the present invention, and further that the size of gaps 328 shown in FIG. 3 has been exaggerated for the purposes of this discussion. Any gaps 328 present in a separator assembly may be eliminated by filling the gap with gap sealant 326. Gap sealants 326 include curable sealants, adhesive sealants, and the like.

Figure 4A:
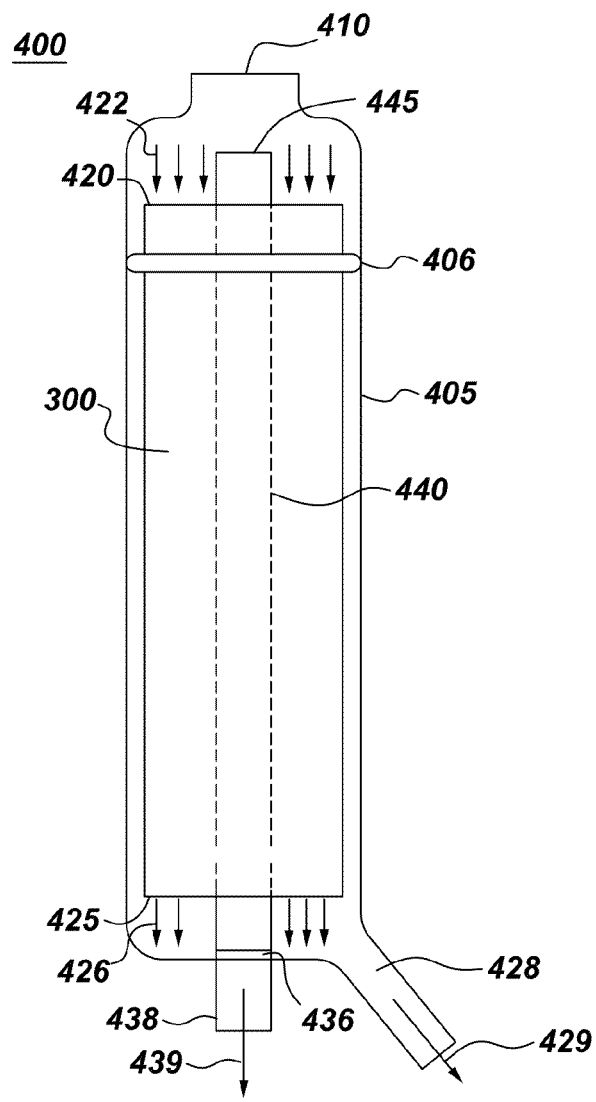
FIG. 4A and FIG. 4B illustrate a spiral flow reverse osmosis apparatus and components thereof in accordance with one or more embodiments of the present invention.
Figure 4B:
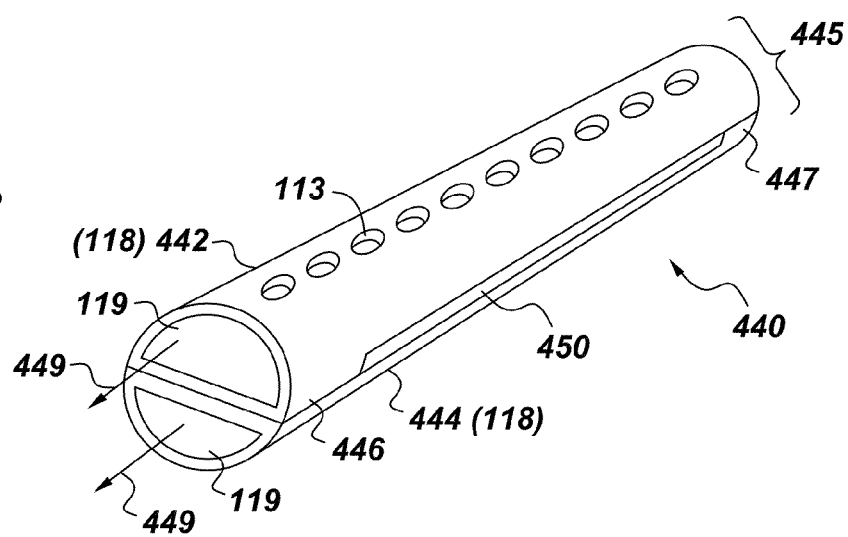

Referring to FIG. 4A, the figure represents a side-on view of a spiral flow reverse osmosis apparatus 400 comprising the separator assembly 300 illustrated in FIG. 3 and comprising a central core element 440 in accordance with an embodiment of the invention. The spiral flow reverse osmosis apparatus 400 comprises a separator assembly 300 secured by a gasket 406 within a pressurizable housing 405. Gasket 406 also prevents passage of feed solution through the apparatus 400 by means other than the interior of the separator assembly 300. The pressurizable housing 405 comprises a feed inlet 410 configured to provide a feed solution to the feed surface 420 (the "first surface") of the separator assembly 300. Numbered elements 422 represent the direction of flow of feed solution (not shown) into and through separator assembly 300 during operation. The pressurizable housing 405 comprises a permeate exhaust outlet 438 coupled via coupling member 436 to the permeate exhaust conduits 118 of central core element 440 of separator assembly 300. Direction arrow 439 indicates the direction of permeate flow during operation. Concentrate (not shown) emerges from the separator assembly at concentrate surface 425 in the direction indicated by direction arrows 426 and exits the pressurizable housing 405 via concentrate exhaust outlet 428, the concentrate flowing in direction 429 during operation. FIG. 4B shows perspective view of a central core element 440 in accordance with an embodiment of the invention and present in separator assembly 300. In the embodiment illustrated in FIG. 4B central core element 440 is comprised of two half cylinder shaped tubes 442 and 444 serving as the permeate exhaust conduits 118 in separator assembly 300. At one end 445 of central core element 440, the permeate exhaust conduits are closed and at the opposite end the permeate exhaust conduits are open. (At various points in this disclosure, the closed end of a porous exhaust conduit is referenced as element 445. The open end of a permeate exhaust conduit may at times herein be referred to as the open terminus of the permeate exhaust conduit.) Those skilled in the art will appreciate that the permeate exhaust conduits 442 and 444 have slightly different structures and are therefore given different numbers for the purposes of this discussion. Thus, permeate exhaust conduit 442 comprises a spacer element 446 at the open end of central core element 440, whereas permeate exhaust conduit 444 comprises a spacer element 447 at the closed end (445) of central core element 440. Spacer elements 446 and 447 define a cavity 450 which accommodates the first portion 231 of the membrane stack assembly 120 as shown in FIG. 2A. Because spacer elements 446 and 447 are integral to and form part of permeate exhaust conduits 442 and 444 respectively, cavity 450 may logically be said to be defined by permeate exhaust conduits 442 and 444. Each of permeate exhaust conduits 442 and 444 comprises openings 113 through which permeate may pass from the outer surface of the permeate exhaust conduit in contact with the permeate carrier layer into the interior 119 (the exhaust channel) of the permeate exhaust conduit. Because the permeate exhaust conduits of central core element 440 are blocked at end 445, flow of permeate through the permeate exhaust conduits is unidirectional in direction 449 when central core element is comprised within a separator assembly 300 used as shown in FIG. 4A.

Figure 5A:
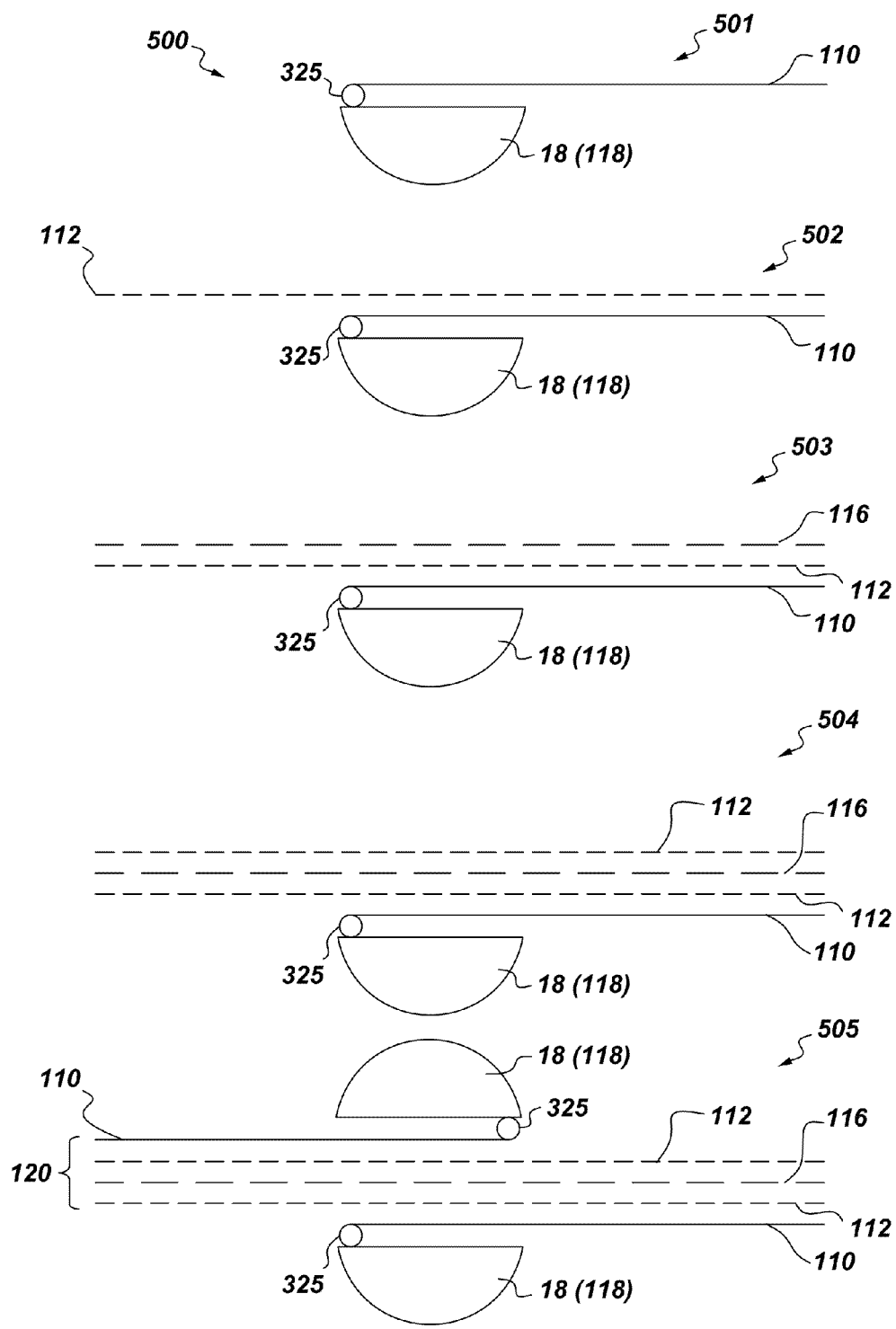
FIG. 5A, FIG. 5B and FIG. 5C illustrate a method of making a separator assembly in accordance with one or more embodiments of the present invention.
Figure 5B:
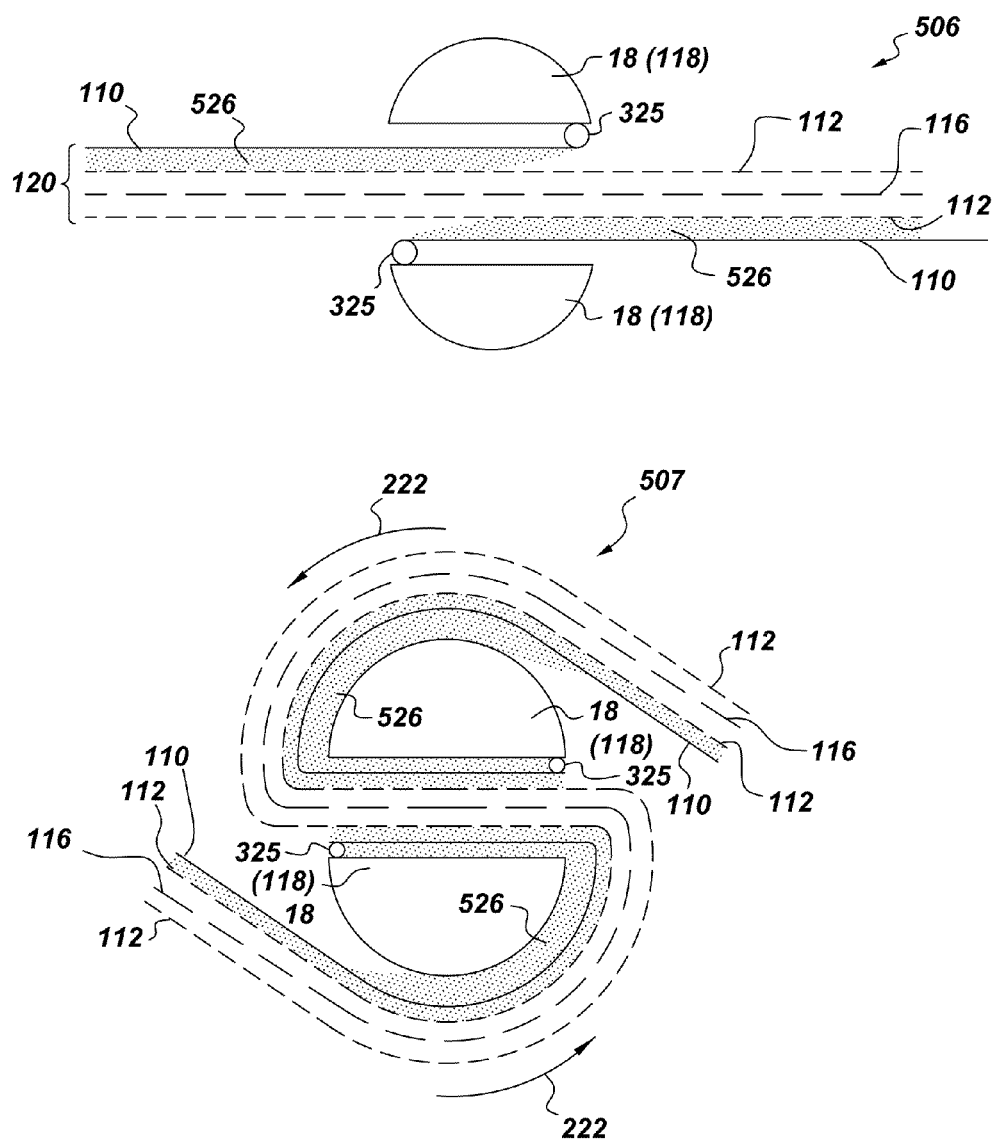

Referring to FIG. 5A, the figure represents a method 500 in accordance with an embodiment of the present invention for making the separator assembly 300 shown in FIG. 3. In a first method step 501 a first intermediate assembly is formed by providing a permeate exhaust conduit 118 and applying a bead of glue (not shown) along a line 325 running a length of the permeate exhaust conduit and thereafter placing the permeate carrier layer 110 in contact with the uncured glue along line 325 and curing to provide the first intermediate assembly shown. Method step 501 is repeated to provide a second first intermediate assembly is the complement to that shown in step 501. The portion of the permeate exhaust conduit referred to as "a length of the permeate exhaust conduit" corresponds to the width of the permeate carrier layer and to that portion of the permeate exhaust conduit adapted for contact with the permeate carrier layer. As is apparent from this example and other parts of this disclosure, the length of the permeate exhaust conduit is typically greater than the length of that portion of the permeate exhaust conduit adapted for contact with the permeate carrier layer. And typically, the permeate exhaust conduit is longer than the width of multilayer membrane assembly disposed around it in the separator assembly provided by the present invention. That portion of the permeate exhaust conduit adapted for contact with the permeate carrier layer is porous, for example by being provided with openings, for example those shown as elements 113 in FIG. 4. That portion of the permeate exhaust conduit not adapted for contact with the permeate carrier layer may not be porous except with respect to flow control baffles and openings such as elements 714 and 1001 featured in FIG. 10. In certain embodiments of the present invention that portion of the permeate exhaust conduit not adapted for contact with the permeate carrier layer is not porous.

In a second method step 502, a second intermediate assembly is prepared. A membrane layer 112 having an active surface (not shown) and a passive surface (not shown) is placed in contact with the first intermediate assembly of method step 501 such that the passive surface (not shown) of the membrane layer 112 is in contact with the permeate carrier layer 110. The membrane layer 112 is positioned such that it is bisected by, but not in contact with, permeate exhaust conduit 118.

In a third method step 503, a third intermediate assembly is formed. Thus a feed carrier layer 116 is applied to the second intermediate assembly shown in method step 502 such that the feed carrier layer is in contact with the active surface (not shown) of membrane layer 112 and is coextensive with it.

In a fourth method step 504, a fourth intermediate assembly is formed. Thus a second membrane layer 112 is added to the third intermediate assembly and placed in contact with feed carrier layer 116 such that the active surface (not shown) of the membrane layer is in contact with the feed carrier layer 116 and the second membrane layer is coextensive with the feed carrier layer.

In a fifth method step 505, a fifth intermediate assembly is formed. A first intermediate assembly as depicted in method step 501 is joined to the fourth intermediate assembly depicted in method step 504. The fifth intermediate assembly depicted in method step 505 features a membrane stack assembly 120 comprising one feed carrier layer disposed between two membrane layers 112, and two permeate carrier layers. The fifth intermediate assembly shown in method step 505 shows a first portion of membrane stack assembly 120 disposed within the cavity defined by the central core element comprising porous exhaust conduits 18 (118); and further shows a second portion of membrane stack assembly 120 disposed outside of the central core element.

In a sixth method step 506 an edge sealant 526 is applied as a longitudinal line along each edge of membrane layer 112 in contact with the permeate carrier layer to afford a sixth intermediate assembly. The edge sealant is applied to the passive surface (not shown) of membrane layer. The edge sealant permeates the adjacent permeate carrier layer along the entire length of its edge.

In a seventh method step 507 the free portions of the sixth intermediate assembly (also referred to as the "second portion" of the membrane stack assembly) are wound around the central core element before curing of the edge sealant 526. Winding the second portion of the membrane stack assembly around the central core element is carried out while the edge sealant is in an uncured state to allow the surfaces of layers of the membrane stack assembly some freedom of motion during the winding process. In one embodiment, the edge sealant 526 is applied as part of the winding step. The structure shown in method step 507 (a seventh intermediate assembly) depicts the structure shown in method step 506 after rotating the central core element through 180 degrees. The preparation of separator assembly 300 may be completed by rotating the central core element in direction 222 thereby winding the second portion of the membrane stack assembly around the central core element to form a wound assembly, and then securing the ends of the membrane stack assembly. The ends of the membrane stack assembly present in the wound assembly may be secured by various means such as by wrapping the "third surface" of the cylinder defined by the separator assembly with tape, securing the ends of the membrane stack assembly with o-rings, applying a sealant to the ends of the membrane stack assembly, and like means. The wound second portion of the membrane stack assembly is referred to in this embodiment as the multilayer membrane assembly. This multilayer membrane assembly is said to be disposed around the central core element comprising permeate exhaust conduits 118. Curing of edge sealant 526, effectively seals the edges of the permeate carrier layer and membrane layer 112 at both the feed surface and the concentrate surface of the separator assembly, and blocks fluid transmission from the feed surface except by means of the feed carrier layer 116.

Figure 5C:
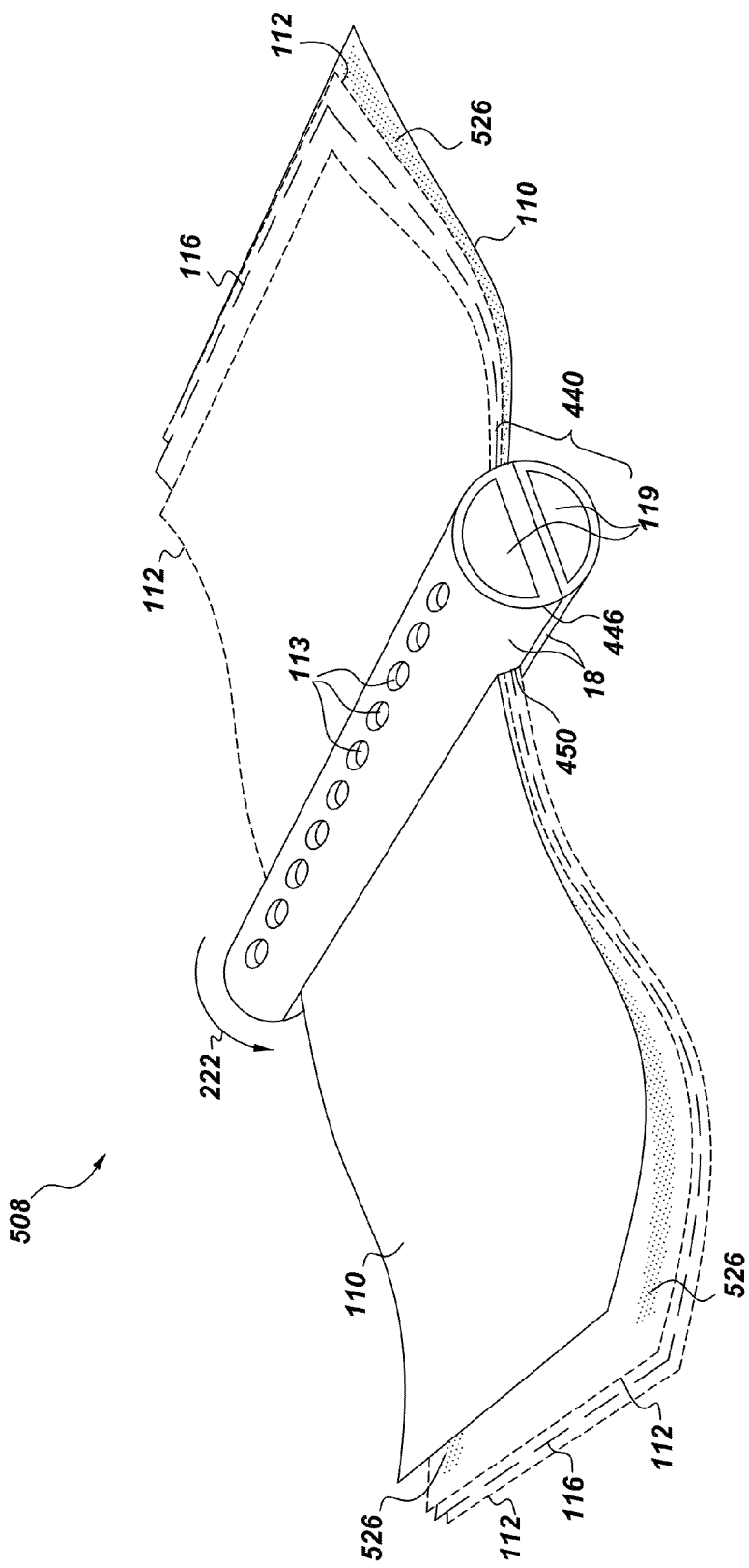

Referring to FIG. 5C, structure 508 presents a perspective view of a membrane stack assembly 120 disposed within a cavity defined by a central core element 440 in accordance with an embodiment of the invention during the preparation of a separator assembly. The structure 508 corresponds to the sixth intermediate assembly shown in method step 506. A curable edge sealant 526 is shown as disposed along each longitudinal edge (there are a total of four such edges) on the passive surface of membrane layer 112 and in contact with permeate carrier layer 110. The central core element 440 is rotated in direction 222 to provide a wound structure. The free ends of the membrane stack assembly present in the wound structure are then secured by applying additional edge sealant 526 along the transverse edges (there are a total of two such edges) at the passive surface of the membrane layer. In the embodiment shown in FIG. 5C, central core element 440 comprises two permeate exhaust conduits 118 each of which defines an exhaust channel 119. Each of the permeate exhaust conduits 118 (442 and 444) represents a half-cylinder shape tube modified by spacer elements 446 and 447 (FIG. 4B) respectively. Because spacer elements are integral to and form part of permeate exhaust conduits 118, cavity 450 may logically also be said to be defined by permeate exhaust conduits 118. Further, because the central core element is comprised of the permeate exhaust conduits 118, cavity 450 may logically also be said to be defined by the central core element 440. In the embodiment shown in FIG. 5C, permeate exhaust conduits 118 define a cavity 450 between themselves, the cavity being configured to accommodate a first portion of a membrane stack assembly. Openings 113 in each of the permeate exhaust conduits 118 allow fluid communication between the exterior surface of the permeate exhaust conduit and the exhaust channel 119.

Figure 6:
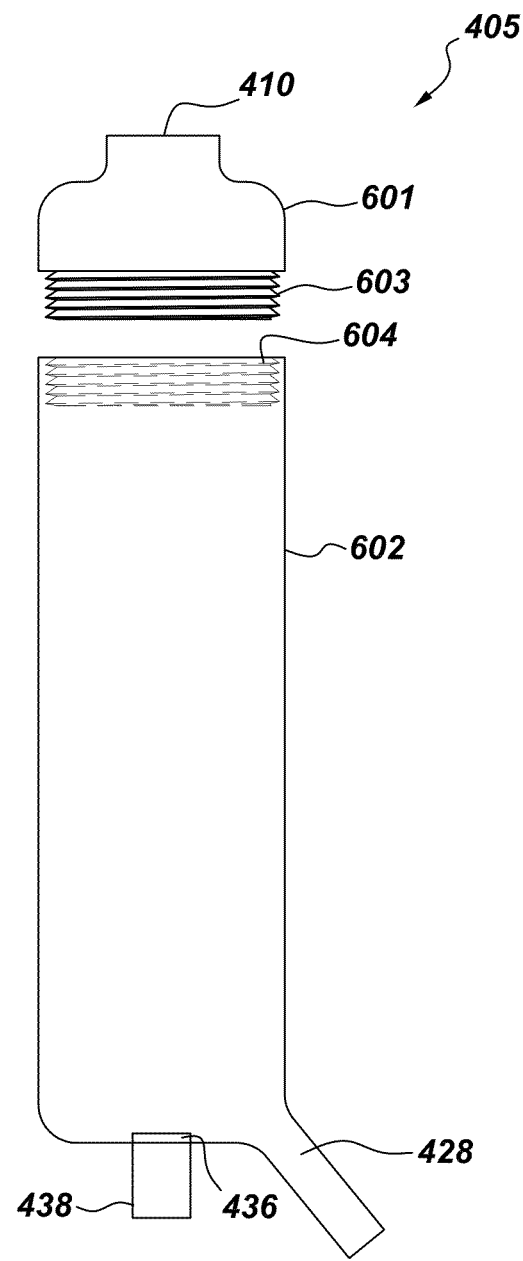
FIG. 6 illustrates a pressurizable housing component of an apparatus provided by the present invention.

Referring to FIG. 6, the figure represents a pressurizable housing 405 used in making the spiral flow reverse osmosis apparatus 400 shown in FIG. 4A comprising a central core element 440 in accordance with an embodiment of the invention. Pressurizable housing 405 comprises a detachable first portion of pressurizable housing 601 and a detachable second portion of pressurizable housing 602. The first and second portions 601 and 602 may be joined by means of threads 603 for securing 601 to 602, and threads 604 which are complementary to threads 603. Other means of securing a detachable first portion of a pressurizable housing to a detachable second of a pressurizable housing include the use of snap together elements, gluing, taping, clamping and like means.

Figure 7:
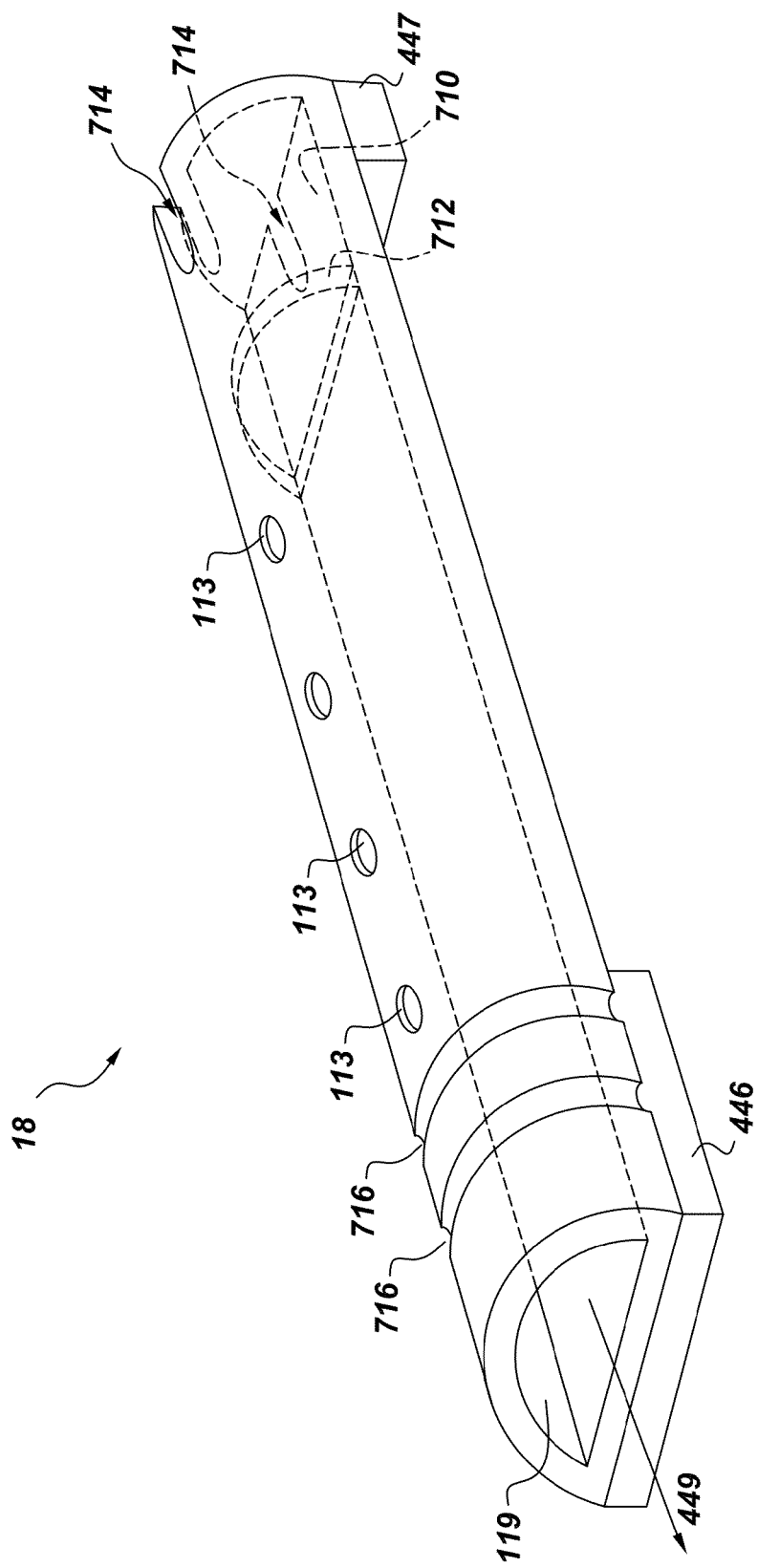
FIG. 7 illustrates a permeate exhaust conduit which may be used in accordance with one or more embodiments of the present invention.

Referring to FIG. 7, the figure represents a permeate exhaust conduit 118 which may be used in accordance with one embodiment of the present invention. Permeate exhaust conduit 118 defines an exhaust channel 119 which is blocked at one end by channel blocking element 712. In the embodiment shown, the permeate exhaust conduit 118 comprises spacer elements 446 and 447 and defines a feed control cavity 710, feed control baffles 714, openings in permeate exhaust conduit 113, and grooves 716 adapted for securing o-rings. In one embodiment, two permeate exhaust conduits 118 (FIG. 7) are joined to provide a central core element defining a cavity configured to accommodate a first portion of a membrane stack assembly 120. Permeate exhaust conduits 118 may be joined such that the spacer elements 446 and 447 of a first permeate exhaust conduit 118 are aligned with the spacer elements 446 and 447 of a second, identical permeate exhaust conduit 118. The second portion of the membrane stack assembly 120 may be wound around the central core element comprising permeate exhaust conduits 118 to afford a wound structure which after appropriate sealing of the ends of the multilayer membrane assembly provides a separator assembly 300 provided by the present invention. The separator assembly 300 comprising a central core element comprising two permeate exhaust conduits 118 may be inserted into a pressurizable housing 405 (FIG. 6) such that the feed control cavities 710 are closest to feed inlet 410. During operation, a feed solution may be introduced through feed inlet 410 into feed control cavities 710. As the feed control cavities become filled excess feed emerges from the feed control baffles 714 and contacts the feed surface of the separator assembly. One of the purposes of the feed control cavities 710 is to prevent uncontrolled contact between the feed solution and the feed surface, particularly at start up. Grooves 716 adapted for securing o-rings may serve to join the permeate exhaust conduits at one end and also to secure the coupling between the separator assembly 300 and coupling member 436 (See FIG. 4A).

Figure 8:
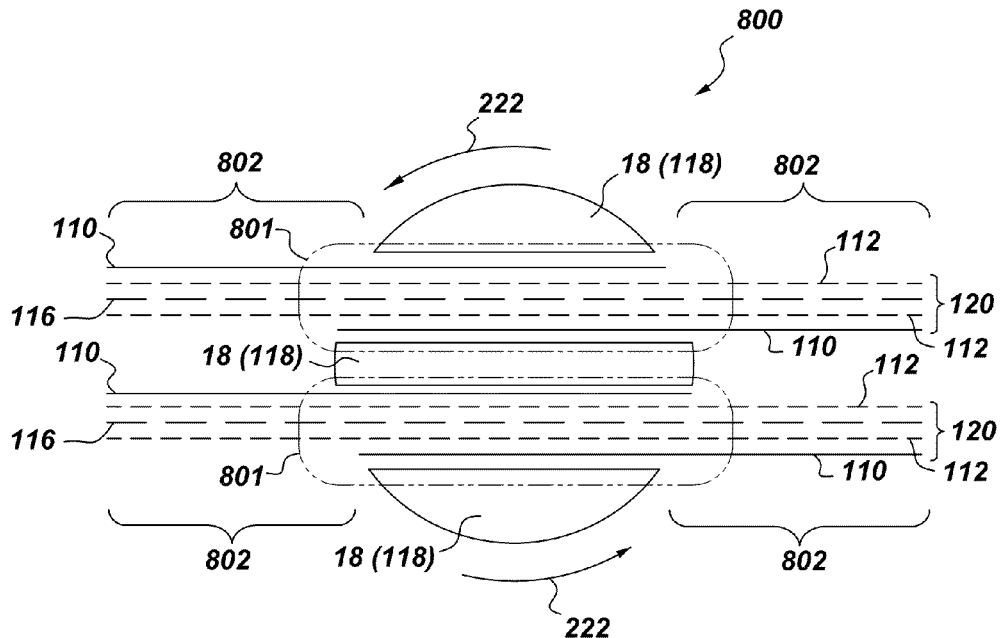
FIG. 8 illustrates membrane stack assemblies and a central core element in accordance with one or more embodiments of the present invention.

Referring to FIG. 8, the FIG. 800 represents a cross-section view at midpoint of a pair of membrane stack assemblies 120 disposed within a central core element in accordance with an embodiment of the invention and comprising three permeate exhaust conduits. As shown the membrane stack assemblies 120 comprise a first portion 801 and a second portion 802. A separator assembly of the present invention is provided by rotating the central core element in direction 222 to provide a wound structure, and sealing the ends of the membrane stack assemblies and curing the edge sealant used on the edges and ends of the membrane stack assembly.

Figure 9:
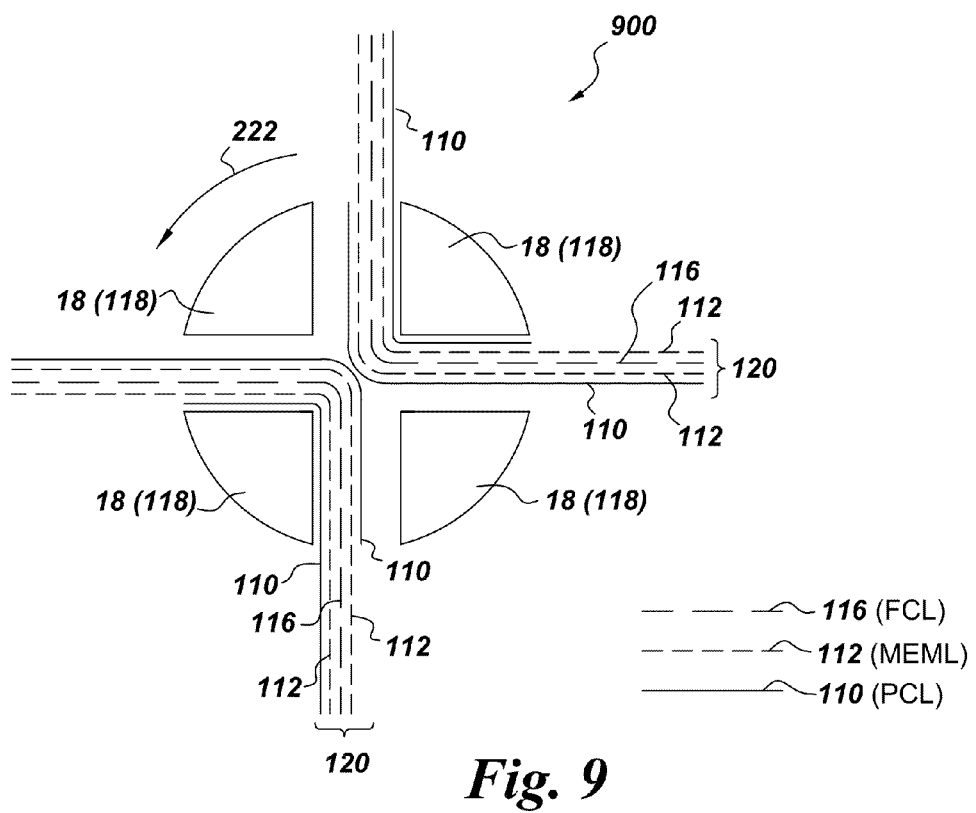
FIG. 9 illustrates membrane stack assemblies and a central core element in accordance with one or more embodiments of the present invention.

Referring to FIG. 9, the FIG. 900 represents a cross-section view at midpoint of pair of membrane stack assemblies 120 disposed within a central core element in accordance with an embodiment of the invention and comprising four permeate exhaust conduits. A separator assembly of the present invention is provided by rotating the central core element in direction 222 to provide a wound structure, and sealing the ends of the membrane stack assemblies and curing the edge sealant used on the edges and ends of the membrane stack assembly.

Figure 10:
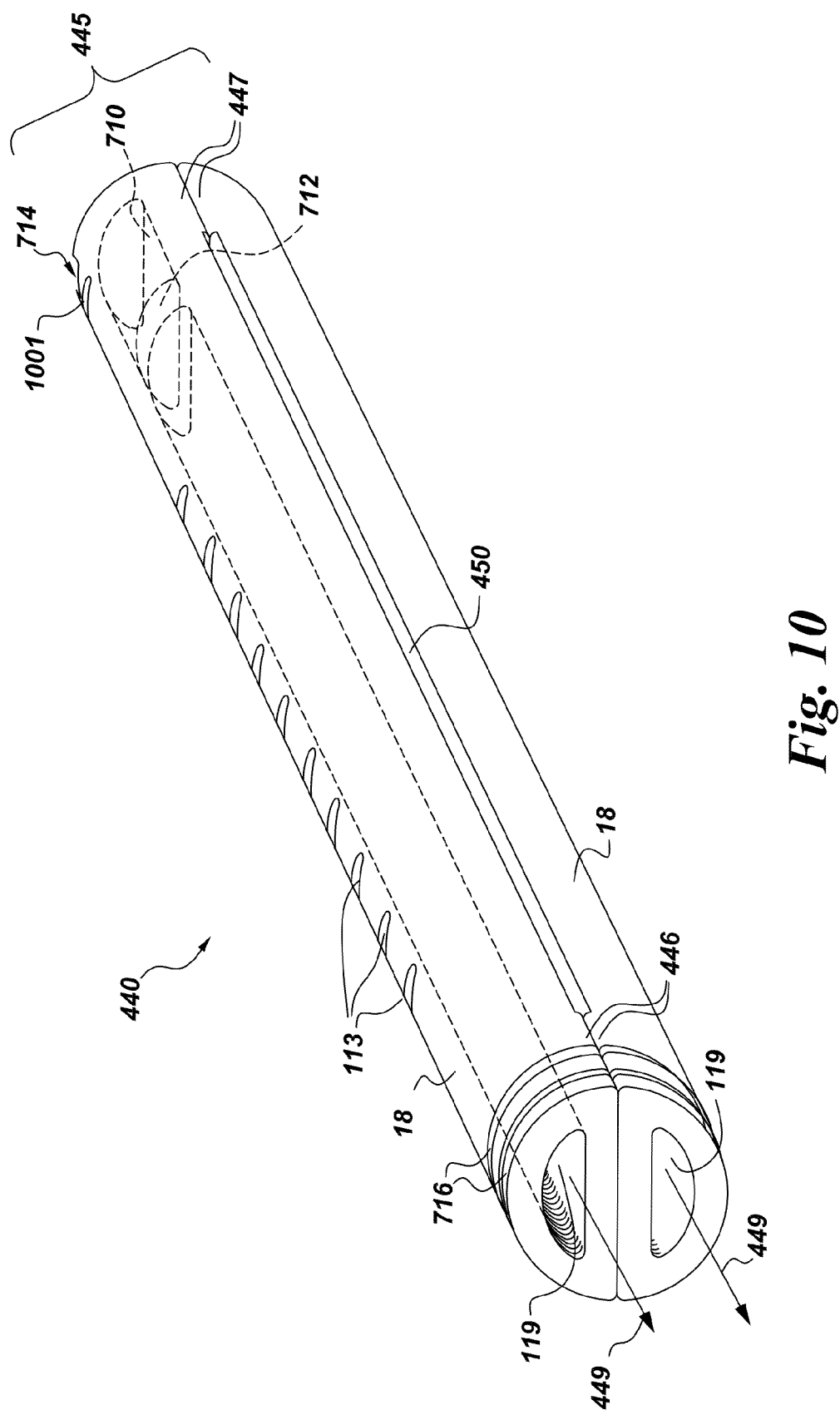
FIG. 10 illustrates a central core element which may be used in accordance with one or more embodiments of the present invention.

Referring to FIG. 10, the FIG. 440 represents a three dimensional view of a central core element which may be used in accordance with an embodiment of the invention. Central core element 440 comprises two identical permeate exhaust conduits 118 and defines a cavity 450 which is configured to accommodate a first portion of a membrane stack assembly. The component permeate exhaust conduits 118 of central core element 440 are essentially the same as that illustrated in FIG. 7 with the exception that the permeate exhaust conduits illustrated in FIG. 10 comprise a feed control hole 1001 adjacent to feed control baffle 714. Central core element 440 comprises a blocked end 445 and an open end from which, during operation, permeate emerges in direction 449. By "blocked end" it is meant that each of the permeate exhaust conduit channels is blocked by a blocking element 712 such that permeate can exit the permeate exhaust conduit only at the end opposite the blocked end. Each of the permeate exhaust conduits also defines a feed control cavity 710. Moreover, the permeate carrier layers 110 of the second portion of the membrane stack assembly may be disposed around permeate exhaust conduits 118 configured as shown in FIG. 10 such that no permeate enters the feed control cavity 710.

Figure 11A:
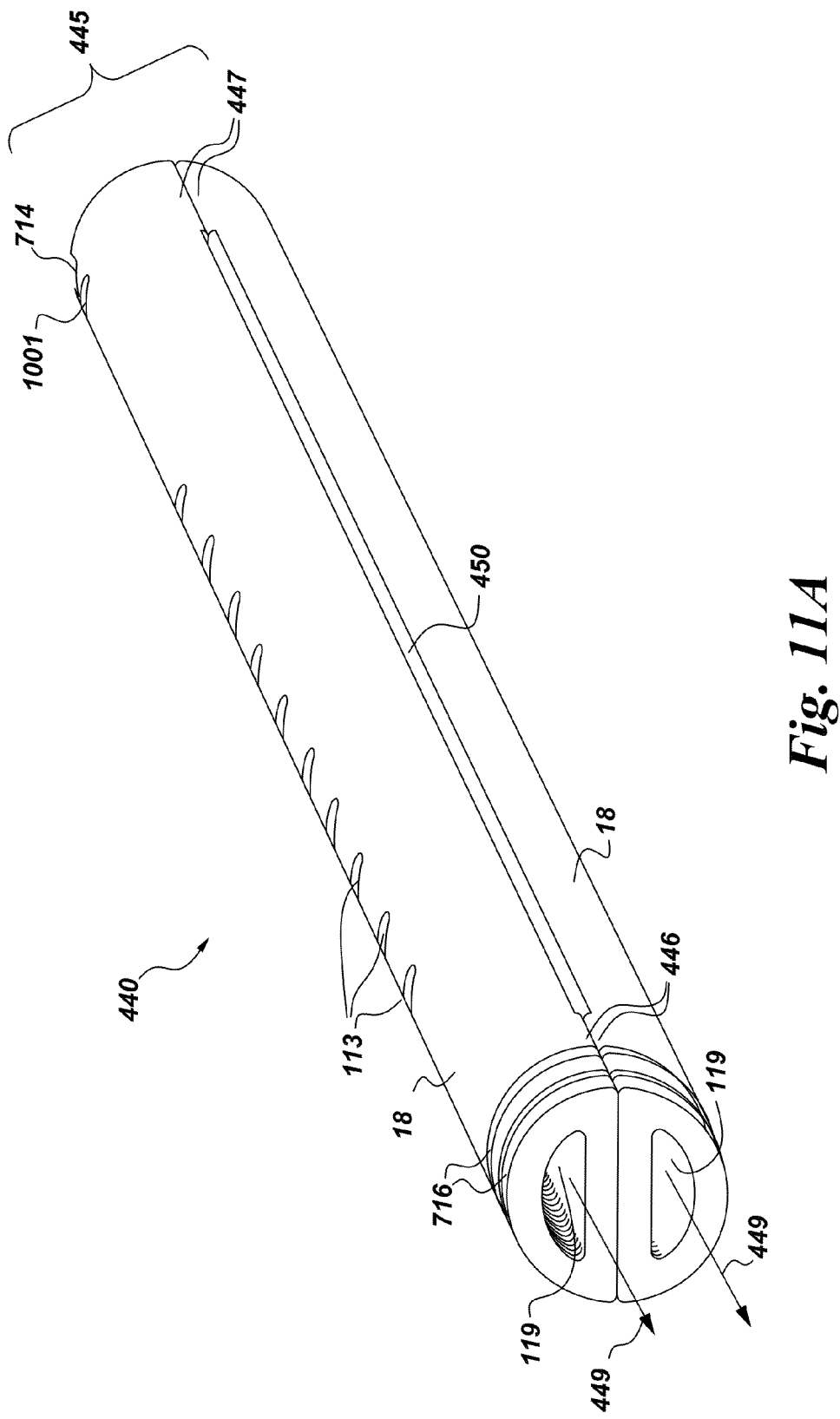
FIG. 11A, FIG. 11B and FIG. 11C illustrate a central core element which may be used in accordance with one or more embodiments of the present invention.
Figure 11B:
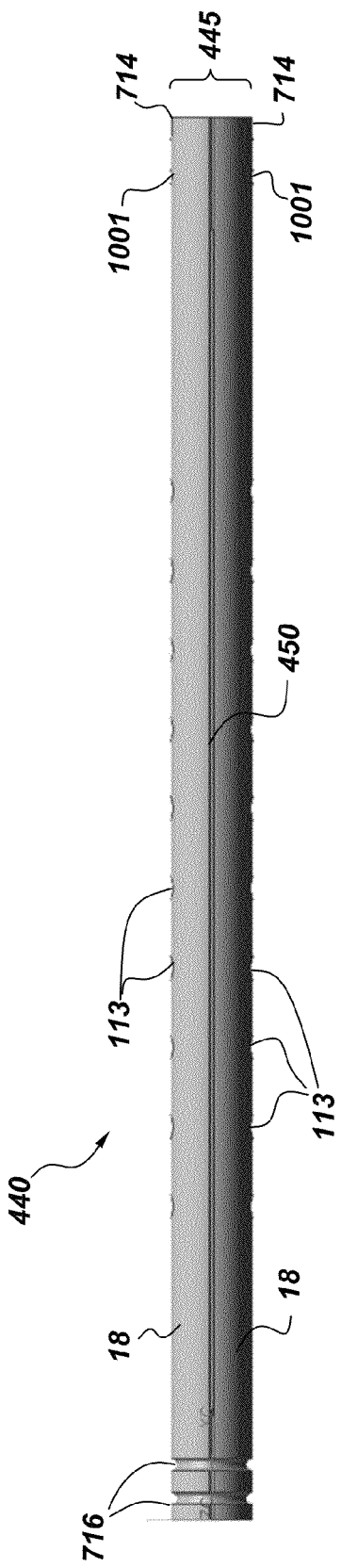
Figure 11C:
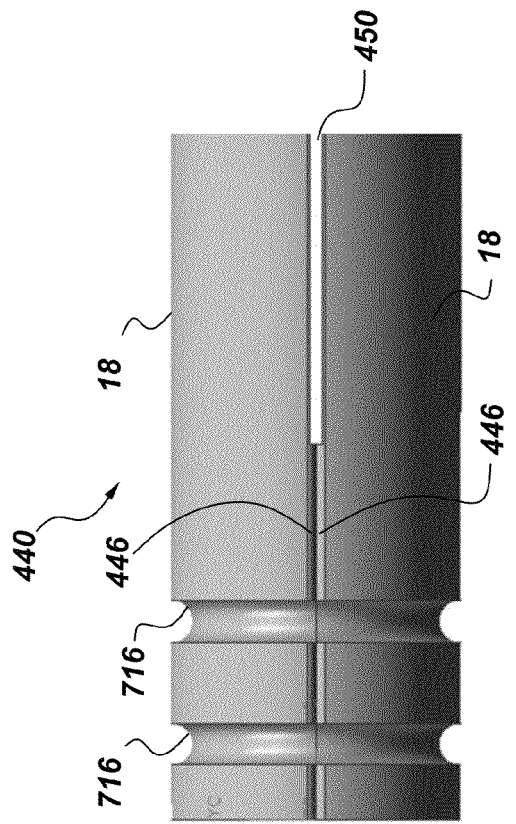

Referring to FIG. 11A, the figure represents a three dimensional solid view of a central core element 440 which may be used in accordance with an embodiment of the invention. The central core element is identical to that illustrated in FIG. 10. FIG. 11B represents a side-on view of the central core element of FIG. 11A. FIG. 11C provides an expanded view of the "open end" of the central core element of FIG. 11A.

Referring to FIG. 12D, the figure represents a central core element 440 which may be used in accordance with one or more embodiments of the invention. Central core element 440 comprises three porous exhaust conduits 18; two porous exhaust conduits 18 having the structure shown in FIG. 12A, and a third porous exhaust conduit having the structure shown in FIG. 12C. The central core element 440 of the example presented by FIG. 12D defines two cavities 451 and 452 each of which is configured to accommodate a first portion of a membrane stack assembly, and may be used to prepare the separator assemblies as disclosed herein. For example, FIG. 8 shows the central core element 440 of FIG. 12D wherein two membrane stack assemblies 120 are disposed within the cavities (451 and 452) defined by the central core element 440 (FIG. 12D). In the embodiment shown in FIG. 8, because each of the porous exhaust conduits is in contact only with one or more permeate exhaust conduits, each of the porous exhaust conduits is denominated a permeate exhaust conduit 118 in FIG. 8. Two of the porous exhaust conduits 18 shown in FIG. 12A are modified half cylinders comprising a spacer element 446 and defining an exhaust channel 119 (not visible in FIG. 12A), openings 113 (not shown) communicating with permeate exhaust channel 119, and grooves 716 adapted for securing an o-ring. The exhaust channel 119 runs the length of each of the three constituent porous exhaust conduits 18 of central core element 440 (FIG. 12D) which in this example are closed at ends 445. Two porous exhaust conduits 18 may be joined to form partial structure 1210 (FIG. 12B) in which openings 113 and exhaust channels 119 are visible. Openings 113 allow fluid from a membrane stack assembly component layer in contact with the outer surface of the porous exhaust conduit to flow into exhaust channel 119. Partial structure 1210 defines a cavity 450 which is configured to accommodate both the third porous exhaust conduit 18 (FIG. 12C) and the first portions of two membrane stack assemblies 120 (for example the membrane stack assemblies configured as shown in FIG. 8). The third porous exhaust conduit 18 (FIG. 12C) may be inserted into cavity 450 of intermediate structure 1210 to form central core element 440 as shown in FIG. 12D which defines cavities 451 and 452, each of which cavities is configured to accommodate a first portion of a membrane stack assembly. The third porous exhaust conduit 18 (FIG. 12C) comprises an exhaust channel 119. Flow of permeate or concentrate through exhaust channel 119 of the third porous exhaust conduit 18 (FIG. 12C) occurs in direction 1232 (See FIG. 12C and FIG. 12D). In the embodiment illustrated in FIG. 12A, FIG. 12B, FIG. 12C and FIG. 12D, the closed ends 445 of the first and second porous exhaust conduits 18 (FIG. 12B) serve to block the upper and lower exit cavities shown in FIG. 12C and prevent fluid from exiting the third porous exhaust conduit except by means of the central passage of exhaust channel 119 (FIG. 12C). As noted, the first and second porous exhaust conduits 18 (FIG. 12A, FIG. 12B and FIG. 12D) are blocked at end 445 and flow of permeate or concentrate through the exhaust channels 119 defined by the first and second porous exhaust conduits is restricted to direction 1234 (FIG. 12B and FIG. 12D).

Referring to FIG. 13A, FIG. 13B and FIG. 13C, the FIG. 13A represents a central core element 440 which may be used in accordance with one or more embodiments of the invention. Central core element 440 comprises four porous exhaust conduits 18 configured such that during operation of a separator assembly comprising the central core element, flow through the exhaust channels of two of the porous exhaust conduits is in one direction while flow through the exhaust channels of the remaining two porous exhaust conduits is in the opposite direction. The central core element 440 illustrated in FIG. 13A comprises two identical central core element components 1300 (FIG. 13B) each comprising two porous exhaust conduits 18. The term "central core element component" is used interchangeably herein with the term "core element component". Central core element components 1300 are illustrated from two viewpoints in FIG. 13B. In a first viewpoint, central core element component 1300 is seen from closed ends 445 of the two porous exhaust conduits 18. The porous exhaust conduits 18 comprising central core element component 1300 are "quarter cylinder" in shape and define openings 113 and exhaust channels 119. The exhaust channels 119 share a common exit cavity 1308 defined by blocking member 1305 and the inner walls of the core element component in the area of the exit cavity. Other features of the central core element component 1300 illustrated in FIG. 13B include grooves 716 adapted for securing an o-ring. Unlike embodiments wherein an o-ring is indicated as securing one central core element component to another, in the embodiment featured in FIG. 13 the o-rings suggested by the presence of grooves 716 are primarily intended to secure the central core element 440 to another component of an apparatus comprising a separator assembly 300 comprising central core element 440, for example the coupling member 446 of a pressurizable housing of a reverse osmosis apparatus. In one embodiment, the gap 1309 between the porous exhaust conduits 18 of a central core element component 1300 is slightly narrower at the closed end 445 than the open end of the central core element component. Under such circumstances, the porous exhaust conduits 18 of the central core element component 1300 are slightly biased toward one another. When two such central core element components 1300 are coupled together to form a central core element 440, this slight bias of the porous exhaust conduits acts to secure the two central core element components to each other without the need for additional securing means such as o-rings.

FIG. 13C illustrates a method 1310 of making the central core element 440 illustrated in FIG. 13A. First, a pair of identical central core element components 1300 is provided. In a first method step, 1311, the closed ends of the central core element components 1300 are engaged. In second third and fourth method steps (1312-1314), the central core element components 1300 are progressively engaged to afford the central core element 440 in which the central core element components are fully engaged.

The central core element 440 illustrated in FIG. 13A may be used in accordance with one or more embodiments of the present invention wherein the porous exhaust conduits 18 define one or more cavities 450 between themselves which are configured to accommodate, and which accommodate, a first portion of a membrane stack assembly. For example, the four cavities 450 defined by the four porous exhaust conduits of the central core element 440 shown in FIG. 13A are in one embodiment configured to accommodate, and accommodate, the two separate membrane stack assemblies as shown in FIG. 9. In the embodiment shown in FIG. 9 each membrane stack assembly comprises two permeate carrier layers 110, two membrane layers 112 and a single feed carrier layer 116. The central core element 440 shown in FIG. 13A defines a gap 1309 (Shown in FIG. 13B) between the porous exhaust conduits 18 of the individual core element components 1300. In one embodiment, gap 1309 accommodates a portion of two different membrane stack assemblies, and in the embodiment shown in FIG. 9 this includes a total of 10 membrane stack assembly layers, five layers contributed from a first membrane stack assembly and five layers contributed from a second membrane stack assembly. In the embodiment shown in FIG. 13A, the cavities 450 and gap 1309 (FIG. 13B) are defined by the relative positions of the first and second sections of the core element components; the second section comprising the porous exhaust conduits and the first section to which the porous exhaust conduits are attached defining the common exit cavity. As noted, the exhaust channels 119 defined by the porous exhaust conduits 18 are in fluid communication the common exhaust cavity 1308. In one embodiment, a first pair of cavities 450 and a first portion of gap 1309 may accommodate a first portion of a first membrane stack assembly 120 by threading one end of the membrane stack assembly into a first cavity 450 of the pair, through gap 1309 and through the second cavity 450 of the pair. In this embodiment the first portion of the first membrane stack assembly is accommodated by the pair of cavities 450 and a first portion of gap 1309. In order to complete the assembly shown in FIG. 9, a second membrane stack assembly is threaded through a second pair of cavities 450 and a second portion of gap 1309 (i.e. a portion of gap 1309 not already occupied by a portion of the first membrane stack assembly. A completed separator assembly may be prepared by winding and sealing the assembly illustrated in FIG. 9.

It should be noted that the foregoing discussion illustrates an inventive feature of one or more embodiments of the present invention. Namely, that the central core element 440 which may be used in accordance with one or more embodiments of the invention may be comprised of core element components (e.g. 1300) each of which is a single piece (a unitary whole) comprising a first section defining an exit cavity and a second section defining one or more porous exhaust conduits. The first section defining the exit cavity also fixes the relative positions in space of the porous exhaust conduits such that in the assembled central core element, the porous exhaust conduits independently define one or more cavities between themselves which may accommodate a first portion of a membrane stack assembly. This cavity, configured to accommodate a first portion of a membrane stack assembly, is defined independently of any component which is not part of the central core element itself. Thus, the dimensions of the cavity are not determined by the dimensions of the membrane stack assembly, nor are the dimensions of the cavity determined by a transient relationship of the porous exhaust conduits to a fixed reference such as a holding jig. In addition, the fact that the central core element 440 may be comprised of core element components each of which is a single piece provides a number of advantages over multi-piece core element components; in particular ease of manufacture, inventorying and handling. In one embodiment, for example that shown in FIG. 13A, the central core element 440 is comprised of identical, single piece core element components 1300, a condition regarded as especially advantageous.

In one aspect, the central core element 440 illustrated in FIG. 13A can be described as comprising two identical core element components 1300, a first core element component and its complement core element component, each of which comprises two porous exhaust conduits 18. Two core element components 1300, each of which is a single piece, may be joined together as illustrated in FIG. 13C to form central core element 440 (FIG. 13A). In one embodiment, the core element components 1300 are joined together by friction couplings, the friction couplings being constituted (as described herein above) by a narrowing of gap 1309 between porous exhaust conduits 18 at closed end 445 relative to the opposite end of the gap (i.e. the gap terminus at blocking element 1305 of the first section of the core element component). This narrowing of gap 1309 may be accomplished by designing the core element component 1300 such that the porous exhaust conduits 18 are slightly biased towards each other in the region of the closed ends 445 of the porous exhaust conduits. This slight biasing of the porous exhaust conduits acts to secure (join) the two core element components 1300 to each other in the central core element 440 by means of friction between the first core element component and its complement core element component in the regions of the closed ends of the porous exhaust conduits adjacent to blocking members 1305 in the assembled central core element. Thus, each core element component comprises a friction coupling constituted by the end portion of porous exhaust conduits 18 in the region in which gap 1309 is at a minimum. When a first core element component 1300 is joined to its complement core element component 1300 to form the central core element 440, a pair of friction joints is created; the friction joints being constituted by the friction coupling of the first core element component in contact with the porous exhaust conduits of its core element component complement, and the friction coupling of the complement core element component in contact with the porous exhaust conduits of the first core element component.

Referring to FIG. 14, the figure represents a core element component 1400 which may be used to form a central core element 440 which may be used in accordance with one or more embodiments of the invention. The core element component comprises a first section 1415 defining an exit cavity 1408 and a second section 1417 comprising a porous exhaust conduit 18 defining an exhaust channel 119 in fluid communication with exit cavity 1408. The porous exhaust conduit 18 is closed at end 445. In the embodiment shown, the core element component 1400 comprises two friction couplings; a first friction coupling 1409 configured as an open mortise coupling, and a second friction coupling 1411 configured as a tenon coupling. In the embodiment shown, first section 1415 comprises a blocking member 1305 designed to prevent entry of fluid into exit cavity 1408 except via exhaust channel 119. Arrow 449 indicates the direction of fluid flow during operation of a separator assembly comprising a central core element 440 comprising core element component 1400.

Referring to FIG. 15, the figure represents a partial cutaway view of a central core element 440 comprising two identical core element components 1400. In addition the figure shows in detail a portion of an open mortise first friction coupling 1409. In the embodiment shown, the central core element 440 comprises two identical core element components 1400 joined together via friction joints comprised of open mortise friction couplings and tenon couplings inserted therein. When joined, together, the core element components 1400 form a central core element 440 which defines a cavity 450 between the porous exhaust conduits 18, the cavity 450 having dimensions suitable to accommodate a first portion of a membrane stack assembly, for example the membrane stack assembly 120 shown in FIG. 2A which comprises a pair of permeate carrier layers 110, a pair of membrane layers 112 and a single feed carrier layer 116. This dimensional suitability of the cavity 450 to accommodate a first portion of a membrane stack assembly is at times referred to herein as being "configured to accommodate a first portion of a membrane stack assembly". The core element components can be designed to accommodate a first portion of any particular membrane stack assembly having any dimensions (e.g. a particular stack height and stack width) or other properties (e.g. stack compressibility, stack swelling properties, etc.) which may relate to the choice of cavity dimensions. In one embodiment, the height and width of the first and second friction couplings 1409 and 1411 may be varied to achieve a particular sized cavity 450. In the embodiment shown, a direction of fluid flow 449 through one of the two exhaust channels 119 defined by the porous exhaust conduits 18 and through the exit cavity 1408 during operation of a separator assembly comprising the central core element 440 is also shown.

Referring to FIG. 16, the figure represents an exploded view of a central core element 440 comprising two identical core element components 1400 each of which comprises a pair of friction couplings, a first closed mortise friction coupling 1409 defined by blocking member 1305 and a second tenon friction coupling 1411 in contact with closed end 445 of porous exhaust conduit 18.

Referring to FIG. 17, the figure represents a solid three dimensional view of a core element component 1400 provided by the present invention comprising a first friction coupling 1409 which is the groove-like structure shown, and a second friction coupling 1411 which is a tongue-like structure. When two such core element components 1400 are engaged "head to tail" (See FIG. 20) the friction couplings 1409 and 1411 form a pair of tongue-and-groove friction joints. In the embodiment of core element component 1400 shown, a wall 1419 comprises part of the porous exhaust conduit 18. When two such core element components 1400 are engaged head to tail walls 1419 and end surfaces 1430 define a cavity 450 configured to accommodate a first portion of a membrane stack assembly. In the embodiment shown, the core element component 1400 comprises a first section 1415 and a second section 1417. First section 1415 defines the first friction coupling 1409 and exit cavity 1408 which is in fluid communication with the interior of the porous exhaust conduit 18. During operation of a separator assembly comprising a central core element 440 comprising core element component 1400, flow through the exit cavity 1408 and porous exhaust conduit 18 is in a direction indicated by arrow 449. Although the core element component 1400 includes grooves 716 adapted for securing a pair of o-rings, such o-rings are not required to secure a pair of core element components 1400 together to form a central core element 440. As noted herein, such grooves 716 are primarily intended to secure the central core element 440 to another component of an apparatus, for example the coupling member 446 of a pressurizable housing of a reverse osmosis apparatus.

Referring to FIG. 18, the figure represents an opposite side solid three dimensional view of the core element component 1400 shown in FIG. 17 and shows an outer surface of the porous exhaust conduit 18 which features openings 113 allowing fluid communication between the outer surface of the porous exhaust conduit and the exhaust channel 119 defined by the porous exhaust conduit which is in fluid communication with exit cavity 1408. In the view shown in FIG. 18, only the second friction coupling 1411 is visible.

Referring to FIG. 19, the figure represents complementary portions of two identical core element components 1400 each having a head end 1420 and a tail end 1422. When engaged head to tail, second friction coupling 1411 engages with first friction coupling 1409 to form one of a pair of friction joints 1424 present in the resultant central core element 440 shown in FIG. 20. In the embodiment shown in FIG. 19, first friction coupling 1409 is configured as a groove in the outer surface of first section 1415 into which section friction coupling 1411 may be inserted to form a friction joint, the outer surface of which joint may be flush with the outer surface of first section 1415. In the embodiment shown, first friction coupling 1409 is at least partially defined by groove-defining end surfaces 1430.

In the embodiment shown in FIG. 20, each of the core element components 1400 comprises a pair of friction couplings (a first groove coupling 1409 and a second tongue coupling 1411) engaged as friction joints 1424 in central core element 440. The central core element defines a cavity 450 which traverses the central core element around a center line (not shown), said cavity extending the length of the porous exhaust conduits 18. The cavity is sized appropriately such that the first portion of a membrane stack assembly fills the entire cavity but in such a manner the first portion of the membrane stack assembly is not subjected to excessive compressive stress within the cavity. Thus, in one embodiment, the fit of the membrane stack assembly within the cavity should be such that the top, bottom and side surfaces of the first portion of the membrane stack assembly are in contact with the interior surfaces of the central core element defining the cavity 450; the groove-defining end surfaces 1430 and walls 1419, but not such that the first portion of the membrane stack assembly is subjected to excessive compressive stress either during assembly of a separator assembly comprising the central core element 440 or during operation of such a separator assembly. Excessive compressive stress is compressive stress that would substantially inhibit flow through or within one or more layers of the membrane stack assembly, or would be such that damage to one or more of the layers would result.

In one embodiment, the present invention provides a salt separator assembly comprising a central core element comprising at least two permeate exhaust conduits, and not comprising a concentrate exhaust conduit, and comprising a membrane stack assembly comprising at least one feed carrier layer, at least two permeate carrier layers, and at least two salt-rejecting membrane layers, the salt-rejecting membrane layers being disposed between the feed carrier layer and the permeate carrier layers. A first portion of the membrane stack assembly is disposed within a cavity configured to accommodate the first portion the membrane stack assembly and defined by the central core element. A second portion of the membrane stack assembly forms a multilayer membrane assembly disposed around the central core element. The feed carrier layer is not in contact with any of the permeate exhaust conduits and is not in contact with the permeate carrier layer. The permeate carrier layers are each in contact with at least one of the permeate exhaust conduits.

In one embodiment, the salt separator assembly provided by the present invention comprises a multilayer membrane assembly which is radially disposed about the central core element. In another embodiment, the present invention provides a salt separator assembly comprising a salt-rejecting membrane layer which has functionalized surface and an unfunctionalized surface. In one embodiment, the salt separator assembly comprises three or more permeate exhaust conduits. In another embodiment, the salt separator assembly comprises three or more permeate carrier layers. In yet another embodiment, the salt separator assembly comprises a plurality of feed carrier layers, and in an alternate embodiment, the salt separator assembly comprises three or more salt-rejecting membrane layers.

In yet another embodiment, the present invention provides a spiral flow reverse osmosis apparatus comprising: (a) a pressurizable housing; and (b) a separator assembly comprising: (i) a central core element comprising at least two permeate exhaust conduits and not comprising a concentrate exhaust conduit, each of said permeate exhaust conduits defining an exhaust channel and one or more openings which allow fluid communication between an exterior surface of the permeate exhaust conduit and the exhaust channel, said permeate exhaust conduits comprising at least one spacer element defining a cavity between said permeate exhaust conduits, said cavity being configured to accommodate a first portion of a membrane stack assembly; and (ii) a membrane stack assembly comprising at least one feed carrier layer, at least two permeate carrier layers, and at least two membrane layers; wherein said first portion of the membrane stack assembly is disposed within said cavity, and wherein a second portion of the membrane stack assembly forms a multilayer membrane assembly disposed around the central core element. The pressurizable housing comprises at least one feed inlet configured to provide feed solution to the feed surface of the separator assembly. The pressurizable housing comprises at least one permeate exhaust outlet coupled to the permeate exhaust conduits, and at least one concentrate exhaust outlet coupled to the concentrate surface of the separator assembly. The pressurizable housing may be made of suitable material or materials. For example, the pressurizable housing may be made of a polymer, stainless steel, or a combination thereof. In one embodiment, the pressurizable housing is made of a transparent plastic material. In another embodiment, the pressurizable housing is made of a transparent inorganic material, for example, glass.

In one embodiment, the present invention provides a spiral flow reverse osmosis membrane apparatus comprising (a) a pressurizable housing and (b) a separator assembly provided by the present invention wherein the multilayer membrane assembly is radially disposed around the central core element. In an alternate embodiment, the present invention provides a spiral flow reverse osmosis membrane apparatus comprising (a) a pressurizable housing and (b) a plurality of separator assemblies provided by the present invention.

In still yet another embodiment, the present invention provides a method for making a separator assembly, the method comprising providing a central core element comprising at least two permeate exhaust conduits and not comprising a concentrate exhaust conduit, each of said permeate exhaust conduits defining an exhaust channel and one or more openings which allow fluid communication between an exterior surface of the permeate exhaust conduit and the exhaust channel, said permeate exhaust conduits independently defining a cavity between said permeate exhaust conduits, said cavity being configured to accommodate a first portion of a membrane stack assembly. Disposing a first portion of a membrane stack assembly within the cavity defined by the permeate exhaust conduits and radially disposing a second portion of the membrane stack assembly around the central core element, and sealing a resultant wound assembly to provide a separator assembly. The membrane stack assembly comprises at least one feed carrier layer, at least two membrane layers, and at least two permeate carrier layers. In the completed separator assembly the permeate exhaust conduit is not in contact with the feed carrier layer, and the feed carrier layer is not in contact with any of the permeate carrier layers, and the permeate carrier layers are in contact with at least one of the permeate exhaust conduits.

In the present example, the expression "radially disposing a second portion of the membrane stack assembly around the central core element, and sealing a resultant wound assembly to provide a separator assembly" refers to the acts of winding the second portion of the membrane stack assembly around the central core element, and sealing ends of the membrane stack assembly.

The foregoing examples are merely illustrative, serving to illustrate only some of the features of the invention. The appended claims are intended to claim the invention as broadly as it has been conceived and the examples herein presented are illustrative of selected embodiments from a manifold of all possible embodiments. Accordingly, it is Applicants' intention that the appended claims are not to be limited by the choice of examples utilized to illustrate features of the present invention. As used in the claims, the word "comprises" and its grammatical variants logically also subtend and include phrases of varying and differing extent such as for example, but not limited thereto, "consisting essentially of" and "consisting of." Where necessary, ranges have been supplied, those ranges are inclusive of all sub-ranges there between. It is to be expected that variations in these ranges will suggest themselves to a practitioner having ordinary skill in the art and where not already dedicated to the public, those variations should where possible be construed to be covered by the appended claims. It is also anticipated that advances in science and technology will make equivalents and substitutions possible that are not now contemplated by reason of the imprecision of language and these variations should also be construed where possible to be covered by the appended claims.

What is claimed is:

1. A separator assembly comprising:
    (a) a central core element comprising at least two permeate exhaust conduits and not comprising a concentrate exhaust conduit,
    each of said permeate exhaust conduits defining an exhaust channel and one or more openings which allow fluid communication between an exterior surface of the permeate exhaust conduit and the exhaust channel,
    said permeate exhaust conduits comprising at least one spacer element defining a cavity between said permeate exhaust conduits,
    said cavity being configured to accommodate a first portion of a membrane stack assembly; and
    (b) a membrane stack assembly comprising at least one feed carrier layer, at least two permeate carrier layers, and at least two membrane layers;
    wherein said first portion of the membrane stack assembly is disposed within the cavity defined by the permeate exhaust conduits, and
    wherein a second portion of the membrane stack assembly forms a multilayer membrane assembly disposed around the central core element.

2. The separator assembly according to claim 1, wherein at least one of the permeate exhaust conduits is selected from the group consisting of porous half-octagon shaped tubes, porous half-decahedron shaped tubes, and porous half tetradecahedron shaped tubes.

3. The separator assembly according to claim 1, wherein all said permeate exhaust conduits have identical shapes.

4. The separator assembly according to claim 1 comprising at least four permeate exhaust conduits.

5. The separator assembly according to claim 1, wherein at least one of said permeate exhaust conduits comprises a blocking element.

6. The separator assembly according to claim 1, wherein the permeate exhaust conduits define one or more grooves configured to secure an o-ring.

7. The separator assembly according to claim 1, wherein the central core element defines at least two cavities configured to accommodate a first portion of a membrane stack assembly.

8. A separator assembly comprising:
    (a) a central core element comprising at least two permeate exhaust conduits and not comprising a concentrate exhaust conduit,
    each of said permeate exhaust conduits defining an exhaust channel and one or more openings which allow fluid communication between an exterior surface of the permeate exhaust conduit and the exhaust channel,
    said permeate exhaust conduits independently defining a cavity between said permeate exhaust conduits,
    said cavity being configured to accommodate a first portion of a membrane stack assembly; and
    (b) a membrane stack assembly comprising at least one feed carrier layer, at least two permeate carrier layers, and at least two membrane layers;
    wherein said first portion of the membrane stack assembly is disposed within the cavity defined by the permeate exhaust conduits, and
    wherein a second portion of the membrane stack assembly forms a multilayer membrane assembly disposed around the central core element.

9. The separator assembly according to claim 8, wherein at least one of the permeate exhaust conduits is selected from the group consisting of porous half-octagon shaped tubes, porous half-decahedron shaped tubes, and porous half tetradecahedron shaped tubes.

10. The separator assembly according to claim 8, wherein all said permeate exhaust conduits have identical shapes.

11. The separator assembly according to claim 8, wherein at least one of said permeate exhaust conduits comprises a blocking element.

12. A separator assembly comprising:
    (a) a central core element comprising at least two identical core element components, each of said core element components comprising at least one permeate exhaust conduit and at least one friction coupling, said friction couplings being configured to join said core element components to form a central core element defining a cavity configured to accommodate a first portion of a membrane stack assembly; and
    (b) a membrane stack assembly comprising at least one feed carrier layer, at least two permeate carrier layers, and at least two membrane layers;
    wherein said first portion of the membrane stack assembly is disposed within the cavity defined by the central core element,
    wherein a second portion of the membrane stack assembly forms a multilayer membrane assembly disposed around the central core element, and
    wherein the core element components do not comprise a concentrate exhaust conduit.

13. The separator assembly according to claim 12, wherein each core element component comprises a single permeate exhaust conduit.

14. The separator assembly according to claim 12, wherein each core element component comprises two permeate exhaust conduits.

15. The separator assembly according to claim 12, wherein each core element component comprises a first friction coupling and a second friction coupling.

16. The separator assembly according to claim 15, wherein said first friction coupling is a mortise coupling and said second friction coupling is a tenon coupling.

17. The separator assembly according to claim 15, wherein said first friction coupling is a groove coupling and said second friction coupling is a tongue coupling.

18. The spiral flow reverse osmosis membrane apparatus according to claim 16, comprising a plurality of separator assemblies.

19. The separator assembly according to claim 12, wherein said friction coupling is a snap fitting.

20. A separator assembly comprising:
    (a) a central core element comprising two identical core element components, each core element component comprising a first section defining an exit cavity and second section comprising a permeate exhaust conduit, each core element component comprising a first friction coupling and a second friction coupling joining the two core element components and defining a cavity between the permeate exhaust conduits configured to accommodate a first portion of a membrane stack assembly; and (b) a membrane stack assembly comprising at least one feed carrier layer, at least two permeate carrier layers, and at least two membrane layers;

wherein said first portion of the membrane stack assembly is disposed within the cavity defined by the central core element, wherein a second portion of the membrane stack assembly forms a multilayer membrane assembly disposed around the central core element, and wherein the core element components do not comprise a concentrate exhaust conduit.

21. The separator assembly according to claim 20, wherein the central core element is cylindrical in shape.

22. The separator assembly according to claim 20, wherein the first and second friction couplings form a mortise and tenon friction joint.

23. The separator assembly according to claim 20, wherein the first and second friction couplings form a tongue and groove friction joint.

24. A spiral flow reverse osmosis apparatus comprising:
(a) a pressurizable housing; and
(b) a separator assembly comprising: (i) a central core element comprising at least two permeate exhaust conduits and not comprising a concentrate exhaust conduit, each of said permeate exhaust conduits defining an exhaust channel and one or more openings which allow fluid communication between an exterior surface of the permeate exhaust conduit and the exhaust channel, said permeate exhaust conduits comprising at least one spacer element defining a cavity between said permeate exhaust conduits; and (ii) a membrane stack assembly comprising at least one feed carrier layer, at least two permeate carrier layers, and at least two membrane layers;

wherein said first portion of the membrane stack assembly is disposed within said cavity, and wherein a second portion of the membrane stack assembly forms a multilayer membrane assembly disposed around the central core element.

25. A separator assembly according to claim 24, wherein at least one of the permeate exhaust conduits is selected from the group consisting of porous half-octagon shaped tubes, porous half-decahedron shaped tubes, and porous half-tetradecahedron shaped tubes.

* * * * *